United States Patent
Lee et al.

(10) Patent No.: US 11,849,201 B2
(45) Date of Patent: Dec. 19, 2023

(54) FOLDABLE ELECTRONIC DEVICE AND METHOD FOR DISPLAYING IMAGES BASED ON FOLDING STATE OF FOLDABLE ELECTRONIC DEVICE

(71) Applicant: SAMSUNG ELECTRONICS CO., LTD., Suwon-si (KR)

(72) Inventors: Seungeun Lee, Suwon-si (KR); Nanhee Kim, Suwon-si (KR); Chakyum Kim, Suwon-si (KR); Minseok Kang, Suwon-si (KR); Seungnyun Kim, Suwon-si (KR); Yongsang Yun, Suwon-si (KR); Youngchan Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 399 days.

(21) Appl. No.: 16/877,836

(22) Filed: May 19, 2020

(65) Prior Publication Data
US 2020/0389578 A1    Dec. 10, 2020

(30) Foreign Application Priority Data
Jun. 7, 2019    (KR) .................. 10-2019-0067462

(51) Int. Cl.
*H04N 23/53*    (2023.01)
*H04M 1/02*    (2006.01)
(Continued)

(52) U.S. Cl.
CPC .............. *H04N 23/53* (2023.01); *G06T 3/40* (2013.01); *G06V 40/161* (2022.01);
(Continued)

(58) Field of Classification Search
None
See application file for complete search history.

(56) References Cited

U.S. PATENT DOCUMENTS 7,283,854 B2    10/2007 Sato et al.
7,848,783 B2 *  12/2010 Taneya ................ H04M 1/0245
                                                 455/566
(Continued)

FOREIGN PATENT DOCUMENTS

| CN | 1489858 | 4/2004 |
|---|---|---|
| KR | 10-2016-0033507 | 3/2016 |
| KR | 10-2018-0037780 | 4/2018 |

OTHER PUBLICATIONS

International Search Report and Written Opinion dated Aug. 20, 2020 in corresponding International Application Mo. PCT/KR2020/006501.
(Continued)

*Primary Examiner* — Haimei Jiang
(74) *Attorney, Agent, or Firm* — Nixon & Vanderhye, P.C.

(57) ABSTRACT

Disclosed are a foldable electronic device and a method for displaying a preview image of a camera in the foldable electronic device. The electronic device includes a first display, at least a portion of which is foldable, a second display, a camera, and a processor, wherein the processor is configured to control the electronic device to: identify a folding state of the first display, based on the identified folding state being a first specific state, display a first preview image generated based on image information acquired through the camera through the first display, and display a second preview image generated based on the image information through the second display, and based on the identified folding state being a second specific state, display a third preview image generated based on the image information through the second display.

19 Claims, 28 Drawing Sheets

(51) Int. Cl.
*G06T 3/40* (2006.01)
*G06V 40/16* (2022.01)

(52) U.S. Cl.
CPC . *H04M 1/0268* (2013.01); *G06T 2207/20132* (2013.01); *H04M 2250/16* (2013.01); *H04M 2250/52* (2013.01)

(56) References Cited

U.S. PATENT DOCUMENTS

| | | | |
|---|---|---|---|
| 9,386,300 B2 * | 7/2016 | Lee | H04N 23/667 |
| 9,489,080 B2 | 11/2016 | Seo et al. | |
| 9,639,177 B2 | 5/2017 | Kim et al. | |
| 2002/0142810 A1 | 10/2002 | Kawasaki et al. | |
| 2004/0023685 A1 * | 2/2004 | Nakamura | H04N 23/632 |
| | | | 455/575.3 |
| 2004/0048633 A1 | 3/2004 | Sato et al. | |
| 2007/0103576 A1 * | 5/2007 | Kawasaki | H04M 1/0245 |
| | | | 348/333.01 |
| 2011/0128401 A1 | 6/2011 | Choi et al. | |
| 2014/0285476 A1 * | 9/2014 | Cho | H04M 1/0268 |
| | | | 345/204 |
| 2015/0009349 A1 * | 1/2015 | Kim | H04N 23/90 |
| | | | 348/218.1 |
| 2016/0050408 A1 * | 2/2016 | Lee | H04N 23/90 |
| | | | 348/47 |
| 2016/0085319 A1 * | 3/2016 | Kim | H04M 1/0268 |
| | | | 345/156 |
| 2016/0085325 A1 * | 3/2016 | Lee | G06F 3/0488 |
| | | | 345/173 |
| 2018/0332205 A1 * | 11/2018 | Hawthorne | H04N 13/257 |
| 2019/0236390 A1 * | 8/2019 | Guo | G06V 40/67 |
| 2020/0050416 A1 | 2/2020 | Myung et al. | |
| 2020/0059597 A1 * | 2/2020 | Chen | H04N 23/64 |
| 2020/0242517 A1 * | 7/2020 | Navarro | G06K 7/1417 |

OTHER PUBLICATIONS

Extended Search Report dated Apr. 4, 2022 in EP Application No. 20818488.7.
Office Action dated Nov. 1, 2023 in Chinese Application No. 202080034175.8 and English-language translation.

* cited by examiner

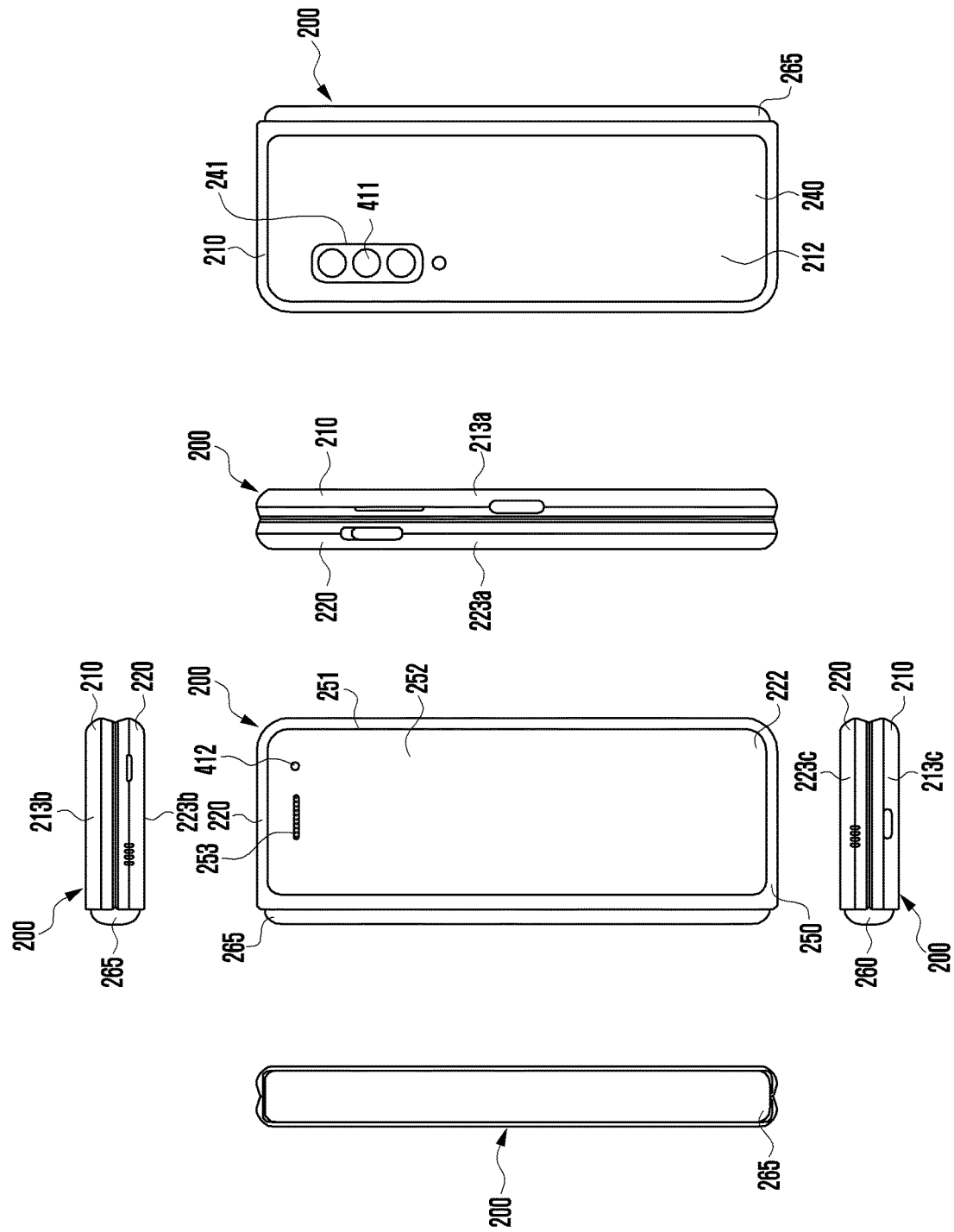

FOLDABLE ELECTRONIC DEVICE AND METHOD FOR DISPLAYING IMAGES BASED ON FOLDING STATE OF FOLDABLE ELECTRONIC DEVICE

CROSS-REFERENCE TO RELATED APPLICATION

This application is based on and claims priority under 35 U.S.C. § 119 to Korean Patent Application No. 10-2019-0067462, filed on Jun. 7, 2019, in the Korean Intellectual Property Office, the disclosure of which is incorporated by reference herein in its entirety.

BACKGROUND

Field

The disclosure relates to a foldable electronic device and a method for displaying a preview image in the foldable electronic device.

Description of Related Art

In recent years, studies on foldable electronic devices having housings that may be folded or unfolded have been actively made. The foldable electronic devices are expected to be next-generation electronic devices that can enlarge the areas of the displays in unfolded states and have reduced volumes in folded states, thereby increasing the convenience of the users.

The foldable electronic device may include a hinge, a first housing and a second housing connected to the hinge, and a main display, at least a portion of which is folded, may be disposed on the front surface of the foldable electronic device. Further, the foldable electronic device may include a sub-display that is independently driven from the main display, and the sub-display may be exposed through the rear surface of the foldable electronic device.

However, the conventional foldable electronic device lacks many functions for providing convenience to the users based on the folded state. For example, the conventional foldable electronic device includes a main display and a sub-display, but functions for controlling the main display and the sub-display based on the folding state are not well known yet.

The above information is presented as background information only to assist with an understanding of the disclosure. No determination has been made, and no assertion is made, as to whether any of the above might be applicable as prior art with regard to the disclosure.

SUMMARY

Embodiments of the disclosure provide a foldable electronic device that can provide a preview image of a camera by controlling a main display or a sub-display based on a folding state and a method for displaying information in the foldable electronic device.

In accordance with an example embodiment of the disclosure, an electronic device may include: a foldable housing including a hinge, a first housing connected to the hinge, and including a first surface facing a first direction and a second surface facing a second direction opposite to the first direction, and a second housing connected to the hinge, including a third surface facing a third direction and a fourth surface facing a fourth direction opposite to the third direction, wherein the second housing is configured to be folded with the first housing using the hinge, wherein the first surface faces the third surface in a fully folded state and the third direction is the same as the first direction in a fully unfolded state; a sensor module including at least one sensor; a first display extending from the first surface to the third surface; a second display viewable through at least a portion of the fourth surface; a first camera operable through at least a portion of the second surface; and a processor, wherein the processor is configured to control the electronic device to: based on a specific application being executed based on a first input, activate the first camera; determine a folding state of the foldable housing using the sensor module; and based on the folding state being a first specific state, display a first preview image generated based on first information acquired through the first camera through the first display, and display a second preview image generated based on the first information through the second display.

In accordance with another example embodiment of the disclosure, an electronic device may include: a first display, at least a portion of which is foldable; a second display; a camera; and a processor, wherein the processor is configured to control the electronic device to: identify a folding state of the first display; based on the identified folding state being a first specific state, display a first preview image generated based on image information acquired through the camera, through the first display, and display a second preview image generated based on the image information, through the second display; and based on the identified folding state being a second specific state, display a third preview image generated based on the image information, through the second display.

In accordance with another example embodiment of the disclosure, a method for displaying information by an electronic device, which includes a first display, at least a portion of which is foldable, a second display, and a camera, may include: identifying a folding state of the first display; based on the identified folding state being a first specific state, displaying a first preview image generated based on image information acquired through the camera, through the first display, and displaying a second preview image generated based on the image information, through the second display; and based on the identified folding state being a second specific state, displaying a third preview image generated based on the image information, through the second display.

The foldable electronic device according to various example embodiments may increase the convenience of a user by displaying a preview image of a camera through a main display and/or a sub-display based on a folding state.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 2B is a diagram illustrating the example electronic device of FIG. 2A in a folded state according to various embodiments;

DETAILED DESCRIPTION

Figure 1:
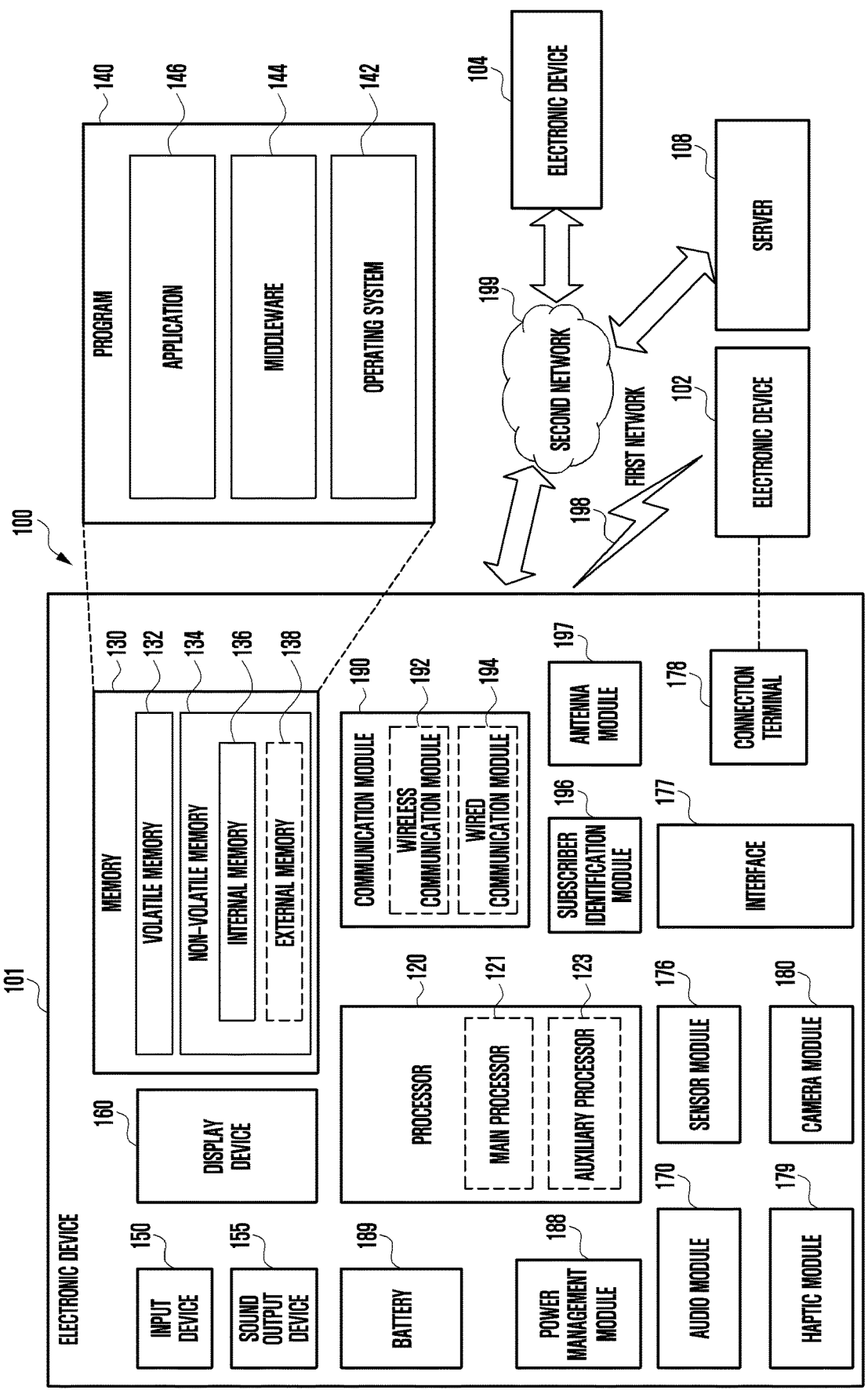
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
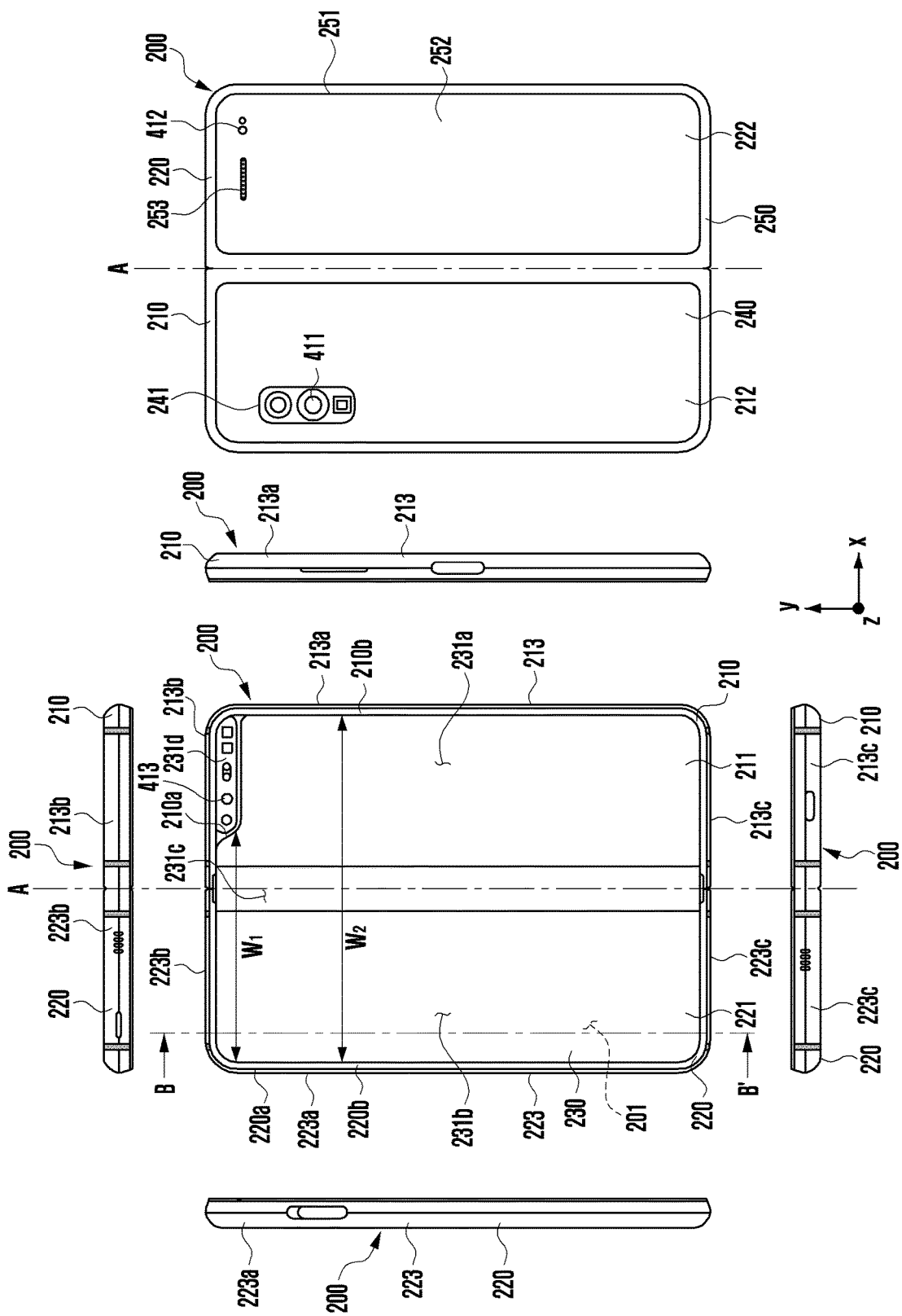
FIG. 2A is a diagram illustrating an example electronic device in an unfolded state according to various embodiments.

FIG. 2A is a diagram illustrating an example electronic device in an unfolded state according to various embodiments. FIG. 2B is a diagram illustrating the electronic device of FIG. 2A in a folded state according to various embodiments;

Referring to FIG. 2A, an electronic device 200 (e.g., the electronic device 101 of FIG. 1) may include a first housing 210 and a second housing 220 including at least one space, in which at least one display may be disposed, at least one display 230 (e.g., a flexible display, a foldable display, or a first display) disposed in the at least one space, a second display (e.g., a sub-display) disposed on one surface of the second housing 220, a hinge (e.g., a hinge 264 of FIG. 3) configured such that the first housing 210 and the second housing 220 are folded with respect to each other, and a hinge cover (e.g., a hinge cover 265 of FIG. 3) that covers foldable portions of the first housing 210 and the second housing 220. In the disclosure, a surface on which first the display 230 is disposed may be defined as a front surface of the electronic device 200, and an opposite surface of the front surface may be defined as a rear surface of the electronic device 200. A surface that surrounds a space between the front surface and the rear surface may be defined as a side surface of the electronic device 200.

In an embodiment, the pair of housings 210 and 220 may include a first housing 210 including a sensor area 231d, a second housing 220, a first rear cover 240, and a second rear cover 250. The pair of housings 210 and 220 of the electronic device 200 are not limited to the shape and coupling state illustrated in FIGS. 2A and 2B, and may be realized through another shape or another combination and/or coupling of components. For example, in another embodiment, the first housing 210 and the first rear cover 240 may be integrally formed, and the second housing 220 and the second rear cover 250 may be integrally formed.

According to an embodiment, the first housing 210 and the second housing 220 may be one housing (not illustrated), and a folded portion of the one housing may be formed of a flexible material (not illustrated), and the hinge 264 may be replaced by a flexible material without being configured separately. According to an embodiment, the first housing 210 and the second housing 220 may be disposed on opposite sides of a folding axis (axis A), and may be folded or unfolded about the folding axis (axis A). According to an embodiment, the angle or the distance between the first housing 210 and the second housing 220 may vary according to whether the state of the electronic device 200 is an unfolded state (a flat state or a closed state), a folded state, or an intermediate state. At least a partial area of the first housing 210 or the second housing 220 may include a sensor area 231d, in which various sensors are disposed. In another embodiment, a sensor arrangement area 231d may be additionally disposed in at least a partial area of the second housing 220 or may be replaced.

Figure 3:
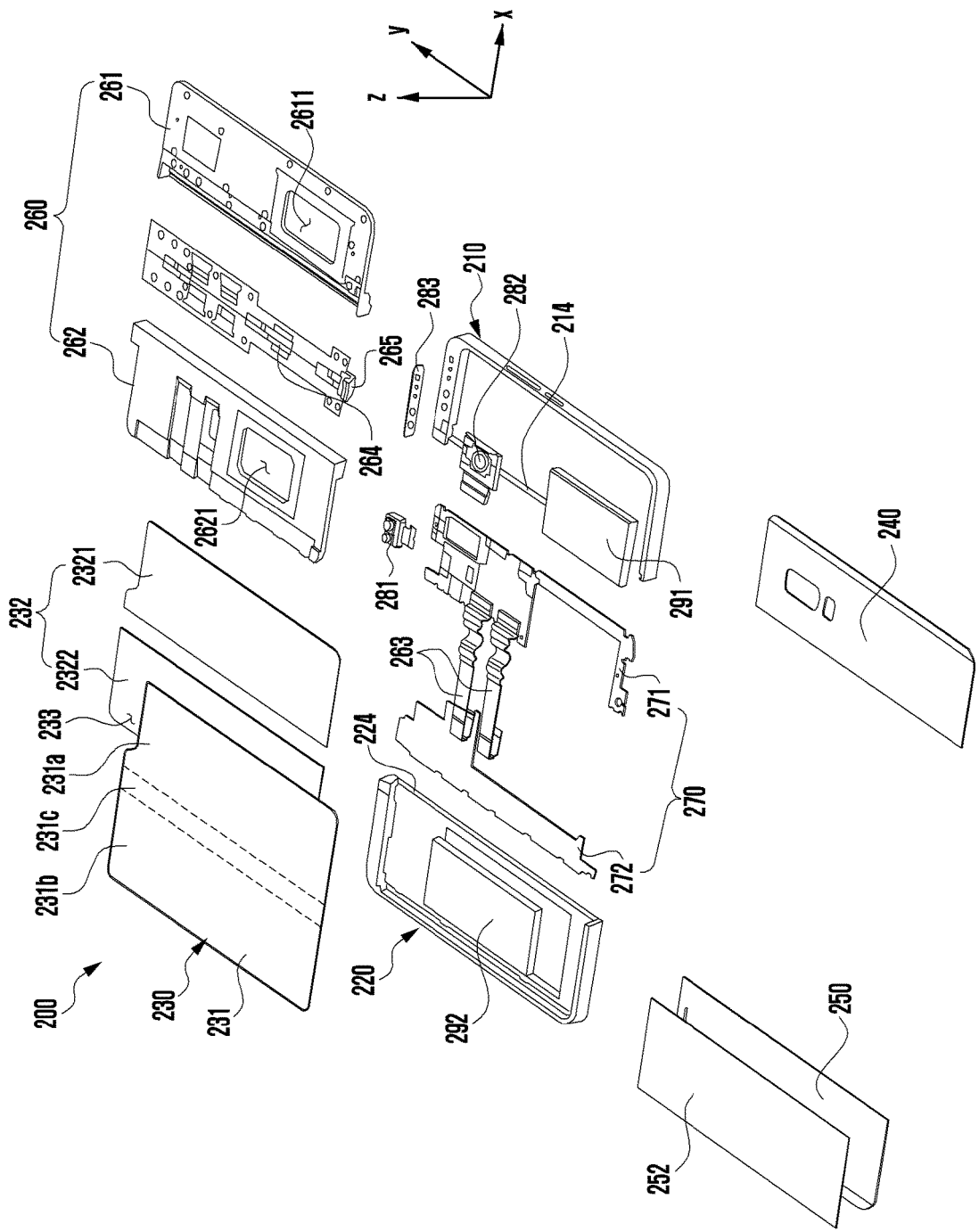
FIG. 3 is an exploded perspective view of an example electronic device according to various embodiments.

According to an embodiment, an angle defined by the first housing 210 and the second housing 220 may be adjusted by the hinge (e.g., the hinge 264 of FIG. 3). According to an embodiment, the electronic device 200 may be said to be in a fully unfolded state when the first housing 210 and the second housing 220 face the same surface (e.g., the front surface) or are in parallel to the same axis (the X axis). According to an embodiment, in the electronic device 200, the first display 230 may be disposed in the space defined by the first housing 210 and the second housing 220, the first display 230 may include a first surface 211 and a third surface 221, and a flexible area that may be bent at a specific angle may be formed between the first surface 211 and the third surface 221. According to an embodiment, in addition to the first surface 211 and the third surface 211, an area that may be bent in various forms may be present in the first display 230, at least a portion of which may be bent, and the number of the areas that may be bent is not limited to one. According to various embodiments, the hinge (e.g., 264 of FIG. 3) may be disposed in an area of the display 230, which may be bent, and when the first display 230 is bent, the first display 230 may be supported such that the first display 230 maintains a predetermined angle while being bent.

According to an embodiment, the first housing 210 may include a first surface 211 disposed to face the front side, a second surface 212 that faces a direction that is opposite to the first surface 211, and a first side member 213 that surrounds at least a portion of the space between the first surface 211 and the second surface 212. In an embodiment, the first side member 213 may include a first side surface 213a disposed parallel to the folding axis (axis A), a second side surface 213b that extends from one end of the first side surface 213a in a direction that is perpendicular to the folding axis, and a third side surface 213c that extends from an opposite end of the first side surface 213a in a direction that is perpendicular to the folding axis (axis A).

In an embodiment, the second housing 220 may include a third surface 221 connected to the hinge (e.g., the hinge 264 of FIG. 3) and disposed to face the front surface of the electronic device 200, a fourth surface 222 that faces an opposite direction of the third surface 221, and a second side surface 220 that surrounds at least a portion of a space between the third surface 221 and the fourth surface 222. In an embodiment, the second side member 220 may include a fourth side surface 223a disposed parallel to the folding axis (axis A), a fifth side surface 223b that extends from one end of the fourth side surface 223a in a direction that is perpendicular to the folding axis, and a sixth side surface 223c that extends from an opposite end of the fourth side surface 223a in a direction that is perpendicular to the folding axis (axis A). In an embodiment, the third surface 221 may face the first surface 211 in the folded state.

In an embodiment, the electronic device 200 may include a recess 201 configured to accommodate the first display 230, at least a portion of which may be bent, through structural shape coupling of the first housing 210 and the second housing 220. According to an embodiment, the recess 201 may have a size that is substantially the same as that of the display 230. In an embodiment, due to the sensor area 231d, the recess 201 may have two different widths in a direction that is perpendicular to the folding axis (axis A). For example, the recess 201 may have a first width W1 between a first portion 220a of the second housing 220 and a first portion 210a disposed at a periphery of the sensor area 231d of the first housing 210, and may have a second width W2 by the second portion 220b of the second housing 210 and a second portion 210b of the first housing 210, which does not correspond to the sensor area 213d and is parallel to the folding axis (the axis A). According to various embodiments, the width of the recess 201 may not be limited to the illustrated example. According to various embodiments, the recess 201 may have two or more different widths, and may have the same width.

In an embodiment, at least a portion of the first housing 210 and the second housing 220 may be formed of a metallic material or a nonmetallic material having a selected strength to support the display 230.

In an embodiment, the sensor area 231d may be disposed to have a predetermined area at a location that is adjacent to one corner of the first housing 210. However, the arrangement, shape, or size of the sensor area 231d may not be limited thereto. According to various embodiments, at least one of a front camera device, a receiver, a proximity sensor, an ultrasonic wave sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an indicator may be disposed at at least a partial area of the sensor area 231d. According to various embodiments, the components may be disposed in the interior of the electronic device while there is provided no separate sensor area. For example, at least some of the components may be disposed under the first display 230 or may be exposed through a partial area of the first display 230.

In an embodiment, the first rear cover 240 may be disposed on the second surface 212 of the first housing 210, and may have a substantially rectangular periphery. In an embodiment, at least a portion of the periphery may be surrounded by the first housing 210. Similarly, the second rear cover 250 may be disposed on the fourth surface 222 of the second housing 220, and at least a portion of the periphery may be surrounded by the second housing 220.

In the illustrated embodiment, the first rear cover 240 and the second rear cover 250 may have shapes that are substantially symmetrical to each other with respect to the folding axis (axis A). In another embodiment, the first rear cover 240 and the second rear cover 250 may include various different shapes. In another embodiment, the first rear cover 240 may be integrally formed with the first housing 210, and the second rear cover 250 may be integrally formed with the second housing 220.

In an embodiment, the first rear cover 240, the second rear cover 250, the first housing 210, and the second housing 220 may provide spaces, in which various components (e.g., a printed circuit board, an antenna module, a sensor module, or a battery) of the electronic device 200 may be disposed, through coupling structures thereof. In an embodiment, one or more components may be disposed on the rear surface of the electronic device or may be visually exposed. For example, one or more components or sensors may be visually exposed while there is provided no separate sensor area. In various embodiments, the sensor may include a proximity sensor, a rear camera, and/or a flash. In another embodiment, at least a portion of the sub-display 252 (e.g., the second display) may be visually exposed through the second rear area 251 of the second rear cover 250. In another embodiment, the electronic device 200 may include a speaker module 253 disposed through at least a partial area of the second rear cover 250.

The first display 230 may be disposed in the space defined by the first and second housings 210 and 220. For example, the first display 230 may be seated in the recess 201 defined by the first and second housings 210 and 220, and may be disposed to occupy substantially most of the front area of the electronic device 200. Accordingly, the front surface of the electronic device 200 may include a first display 230, and a partial area (e.g., a peripheral area) of the first housing 210 and a partial area (e.g., a peripheral area) of the second housing 220, which are adjacent to the first display 230. In an embodiment, the rear surface of the electronic device 200 may include the first rear cover 240, and a partial area (e.g., a peripheral area) of the first housing 210, which is adjacent to the first rear cover 240, the second rear cover 250, and a partial area (e.g., a peripheral area) of the second housing 220, which is adjacent to the second rear cover 250.

In an embodiment, the first display 230 may refer to a display, at least a partial area of which may be deformed to a flat surface or a curved surface. In an embodiment, the first display 230 may include a folding area 231c, a first area 231a disposed on one side (e.g., the right area with respect to the folding area 231c) of the folding area 231c, and a second area 231b disposed on an opposite side (the left area with respect to the folding area 231c) of the folding area 231c. For example, the first area 231a may be disposed on the first surface 211 of the first housing 210, and the second area 231b may be disposed on the third surface 221 of the second housing 220. In an embodiment, the classification of the areas of the first display 230 is illustrative, and the first display 230 may be classified into a plurality of areas (e.g., four or more or two) according to the structure or function of the first display 230. As an example, although the areas of the first display 230 are classified by the folding area 231c or the folding axis (axis A) extending in parallel to the y axis in the embodiment illustrated in FIG. 2A, the areas of the first display 230 may be classified with reference to another folding area (e.g., a folding area that is parallel to the x axis) or another folding axis (e.g., a folding axis that is parallel to the x axis) in another embodiment. One entire screen of the display 230 may be displayed through the pair of housings 210 and 220 and the hinge (e.g., simply a physical classification by the hinge (e.g., the hinge 264 of FIG. 3), and substantially the pair of housings 210 and 220 and the hinge (e.g., the hinge 264 of FIG. 3) using the above-described classification of the areas of the display. In an embodiment, the first area 231a, unlike the second area 231b, may include a notch area (e.g., the notch area 233 of FIG. 3) that is cut according to presence of the sensor area 231d. In an embodiment, the first area 231a and the second area 231b may include parts having symmetrical shapes, and parts having asymmetrical shapes.

Referring to FIG. 2B, the hinge cover 265 is disposed between the first housing 210 and the second housing 220, and may be configured to cover an internal component (e.g., the hinge 264 of FIG. 3). In an embodiment, the hinge cover 265 may be covered by a portion of the first housing 210 and the second housing 220 or may be exposed to the outside according to the operational state (the unfolded state (flat state or the first specific state) or the folded state or the second specific state) of the electronic device 200.

Hereinafter, the operations of the first housing 210 and the second housing 220 according to the operational states (e.g., the unfolded state (flat state) and the folded state) of the electronic device 200, and the areas of the first display 230 will be described.

According to an embodiment, when the electronic device 200 is in an unfolded state (flat state) (e.g., the state of FIG. 5A), the first housing 210 and the second housing 220 may define a horizontal angle (e.g., 180 degrees). In the unfolded state (e.g., the first specific state), the first area (e.g., 231a of FIG. 2A) and the second area (e.g., 231b of FIG. 2a) of the display may be disposed to face the same direction. Further, when the electronic device is in the unfolded state, the folding area (e.g., 231c of FIG. 2A) may define a plane that is the same as the first area 231a and the second area 231b. As another embodiment, when the electronic device 200 is in the unfolded state (flat state), the first housing 210 and the second housing 220, for example, may be folded in opposite directions such that the second surface 212 and the fourth surface 222 face each other as the second housing 220 rotates such that the angle of the second housing 220 with respect to the first housing 210 becomes 360 degrees.

In an embodiment, when the electronic device 200 is in an intermediate state (e.g., the state of FIG. 5B or the second specific state), the first housing 210 and the second housing 220 may be disposed to define a certain angle (e.g., between 10 degrees to 90 degrees). The first area (e.g., 231a of FIG. 2A) and the second area (e.g., 231b of FIG. 2A) of the first display 230 may define an angle that is larger in the folded state and is smaller in the unfolded state. At least a portion of the folding area (e.g., 231c of FIG. 2A) may be a curved surface having a predetermined curvature, and the curvature then may be smaller than in the folded state.

In an embodiment, when the electronic device 200 is in the folded state (e.g., the state of FIG. 5C or the third specific state), the first housing 210 and the second housing 220 may be disposed to face each other. The first area (e.g., 231a of FIG. 2A) and the second area (e.g., 231b of FIG. 2A) of the first display 230 may be disposed to face each other while the angle defined by them is maintained at an acute angle. At least a portion of the folding area (e.g., 231c of FIG. 2A) may be a curved surface having a predetermined curvature.

FIG. 3 is an exploded perspective view illustrating an example electronic device 200 according to various embodiments.

Referring to FIG. 3, in an embodiment, the electronic device 200 may include a first housing 210, a second housing 220, a first display 230, a first rear cover 240, a second rear cover 250, a support member assembly 260, and at least one printed circuit board 270. In the disclosure, the first display 230 (e.g., the main display) may be called a display module or a display assembly.

The first display 230 may include a display panel 231 (e.g., a flexible display panel), and one or more plates 232 or layers, on which the display panel 231 is seated. In an embodiment, the plate 232 may be disposed between the display panel 231 and the support member assembly 260. A display panel 231 may be disposed at at least a portion of one surface of the plate 232. The plate 232 may include a first plate 2321 and a second plate 2322 that are divided with reference to the hinge 264. The plate 232 may include at least one subsidiary material layer (e.g., a graphite member) disposed on a rear surface of the display panel 231, and/or a conductive plate (e.g., a cu sheet). In an embodiment, the plate 232 may have a shape corresponding to the display panel 231. For example, a partial area of the first plate 2321 may have a shape corresponding to the notch area 233 of the display panel 231.

The support member assembly 260 may include a first support member 261 (e.g., a first support plate), a second support member 262 (e.g., a second support plate), a hinge 264 disposed between the first support member 261 and the second support member 262, a hinge cover 265 that covers the hinge 264 when the hinge 264 is viewed from the outside, and at least one wiring member (e.g., a flexible printed circuit board (FPCB)) that crosses the first support member 261 and the second support member 262.

In an embodiment, the support member assembly 260 may be disposed between the plate 232 and the at least one printed circuit board 270. As an example, the first support member 261 may be disposed between the first area 231a of the first display 230 and the first printed circuit board 271. The second support member 262 may be disposed between the second area 231b of the first display 230 and the second printed circuit board 272.

In an embodiment, at least a portion of the wiring member 263 and the hinge 264 may be disposed in the interior of the support member assembly 260. The wiring member 263 may be disposed in a direction (e.g., the x axis direction) that crosses the first support member 261 and the second support member 262. The wiring member 263 may be disposed in a direction (e.g., the x axis direction) that is perpendicular to the folding axis (e.g., the y axis or the folding axis A of FIG. 2A) of the folding area 231c.

In an embodiment, the at least one printed circuit board 270, as mentioned above, may include a first printed circuit board 271 disposed on the first support member 261, and a second printed circuit board 272 disposed on the second support member 262. The first printed circuit board 271 and the second printed circuit board 272 may be disposed in the interior of the space defined by the support member assembly 260, the first housing 210, the second housing 220, the first rear cover 240, and the second rear cover 250. Components for realizing various functions of the electronic device 200 may be mounted on the first printed circuit board 271 and the second printed circuit board 272.

In an embodiment, a first printed circuit board 271 disposed in the space defined through the first support member 261, a first battery 291 disposed at a location that faces a first swelling hole 2611 of the first support member 261, at least one sensor module 281, or at least one camera module 282 may be included in the first space of the first housing 210.

The first housing 210 may include a window glass 283 disposed to protect at least one sensor module 281 and at least one camera module 282 at a location corresponding to a notch area 233 of the first display 230. In an embodiment, a second printed circuit board 272 disposed in the second space defined through the second support member 262 and a second battery 292 disposed at a location that faces a second swelling hole 2621 of the second support member 262 may be included in the second space of the second housing 220. In an embodiment, the first housing 210 and the first support member 261 may be integrally formed. In an embodiment, the second housing 220 and the second support member 262 also may be integrally formed. According to an embodiment, a second display 252 may be disposed in the second space of the second housing 220. According to an embodiment, the second display 252 may be disposed to be viewed from the outside through at least a partial area of the second rear cover 250. According to various embodiments, the second display 252 may be disposed to occupy substantially most of the fourth surface 222 of the second housing 220. For example, a partial area (e.g., a peripheral area) of the second display 252 and the second rear cover 250 that is adjacent to the second display 252 may be exposed through the fourth surface 222 of the second housing 220.

In an embodiment, the first housing 210 may include a first rotation support surface 214, and the second housing 220 may include a second rotation support surface 224 corresponding to the first rotation support surface 214. The first rotation support surface 214 and the second rotation support surface 224 may include curved surfaces corresponding to the curved surface included in the hinge cover 265.

The electronic device (e.g., the electronic device 200 of FIG. 2A) according to various example embodiments may include: a foldable housing including a hinge (e.g., the 264 of FIG. 3), a first housing (e.g., 210 of FIG. 2A) connected to the hinge, and including a first surface (e.g., 211 of FIG. 2A) facing a first direction and a second surface (e.g., 212 of FIG. 2A) facing a second direction opposite the first direction, and a second housing (e.g., 220 of FIG. 2A) connected to the hinge, including a third surface (e.g., 221 of FIG. 2A) facing a third direction and a fourth surface (e.g., 222 of FIG. 2A) facing a fourth direction opposite the third direction, the second housing configured to be folded with the first housing (e.g., 210 of FIG. 2A) using the hinge, wherein the first surface faces the third surface in a fully folded state and the third direction is the same as the first direction in a fully unfolded state, a sensor module, a first display (e.g., 230 of FIG. 2A) extending from the first surface to the third surface, a second display (e.g., 252 of FIG. 2A) viewable through at least a portion of the fourth surface, a first camera (e.g., 411 of FIG. 2A) exposed through at least a portion of the second surface, and a processor (e.g., 120 of FIG. 1), wherein the processor is configured to control the electronic device to: based on a specific application being executed based on a first input, activate the first camera, determine a folding state of the foldable housing using the sensor module, and based on the folding state being a first specific state, display a first preview image generated based on first information acquired through the first camera through the first display, and display a second preview image generated based on the first information through the second display.

The processor may be configured to control the electronic device to: based on the folding state being the first specific state, detect a facial area from the first information, and based on the facial area being detected, activate the second display, and display the second preview image through the activated second display.

The processor may be configured to control the electronic device to: generate the first preview image from the first information based on a first resolution of the first display, and generate the second preview image from the first information based on a second resolution of the second display.

The processor may be configured to generate the first preview image from the first information based on a first resolution of the first display, and generate the second preview image by cropping at least a portion of the first preview image based on a second resolution of the second display, wherein the cropped portion includes the facial area.

The processor may be configured to control the electronic device to: perform photographing using the first camera based on a second input being received through the first display while the second preview image is displayed, and display information related to the photographing of the first camera through the second display.

The processor may be configured to control the electronic device to: based on detecting that subject included in the second preview image approaches the electronic device after the photographing is performed through the first camera, display an image captured most recently by the first camera, through the second display.

The electronic device may further include a second camera exposed through at least a portion of the fourth surface, and the processor may be configured to control the electronic device to: based on the folding state being a second specific state, activate the second camera, display a third preview image generated based on second information acquired through the second camera through at least a portion of the first display, and display a fourth preview image generated based on the second information through the second display.

The processor may be configured to control the electronic device to: based on the folding state being the second specific state, detect a facial area from the second information, and, based on the facial area being detected, activate the second display, and display the fourth preview image through the activated second display.

The processor may be configured to control the electronic device to: generate the third preview image from the second information based on a third resolution of the at least a portion of the first display, and generate the fourth preview image from the second information based on a second resolution of the second display.

The processor 120 be configured to generate the third preview image from the second information based on a third resolution of the at least a portion of the first display, and generate the fourth preview image by cropping at least a portion of the third preview image based on a second resolution of the second display, wherein the cropped portion includes the facial area.

The electronic device (e.g., the electronic device 200 of FIG. 2A) according to various example embodiments may include a first display (e.g., 230 of FIG. 2A), at least a portion of which is configured to be folded, a second display (e.g., 252 of FIG. 2A), a camera, and a processor (e.g., 120 of FIG. 1). The processor may be configured to control the electronic device to: identify a folding state of the first display, based on the identified folding state being a first specific state, display a first preview image generated based on image information acquired through the camera through the first display, and display a second preview image generated based on the image information through the second display, and, based on the identified folding state being a second specific state, display a third preview image generated based on the image information through the second display.

The processor may be configured to control the electronic device to: generate the first preview image from the first information based on a first resolution of the first display, and generate the second preview image from the first information based on a second resolution of the second display.

The processor may be configured to control the electronic device to: based on the folding state being the first specific state, detect a facial area from the image information, and generate the second preview image by cropping at least a portion of the first preview image based on a second resolution of the second display based on a facial area being detected, wherein the cropped portion includes the facial area.

The first specific state may, for example, be a state in which an angle defined by a first portion of the first display and a second portion of the first display may be in a range of about 90 degrees to 270 degrees. The second specific state may, for example, be a state in which an angle defined by a first portion of the first display and a second portion of the first display may be in a range of about 0 degrees to 10 degrees.

Figure 4:
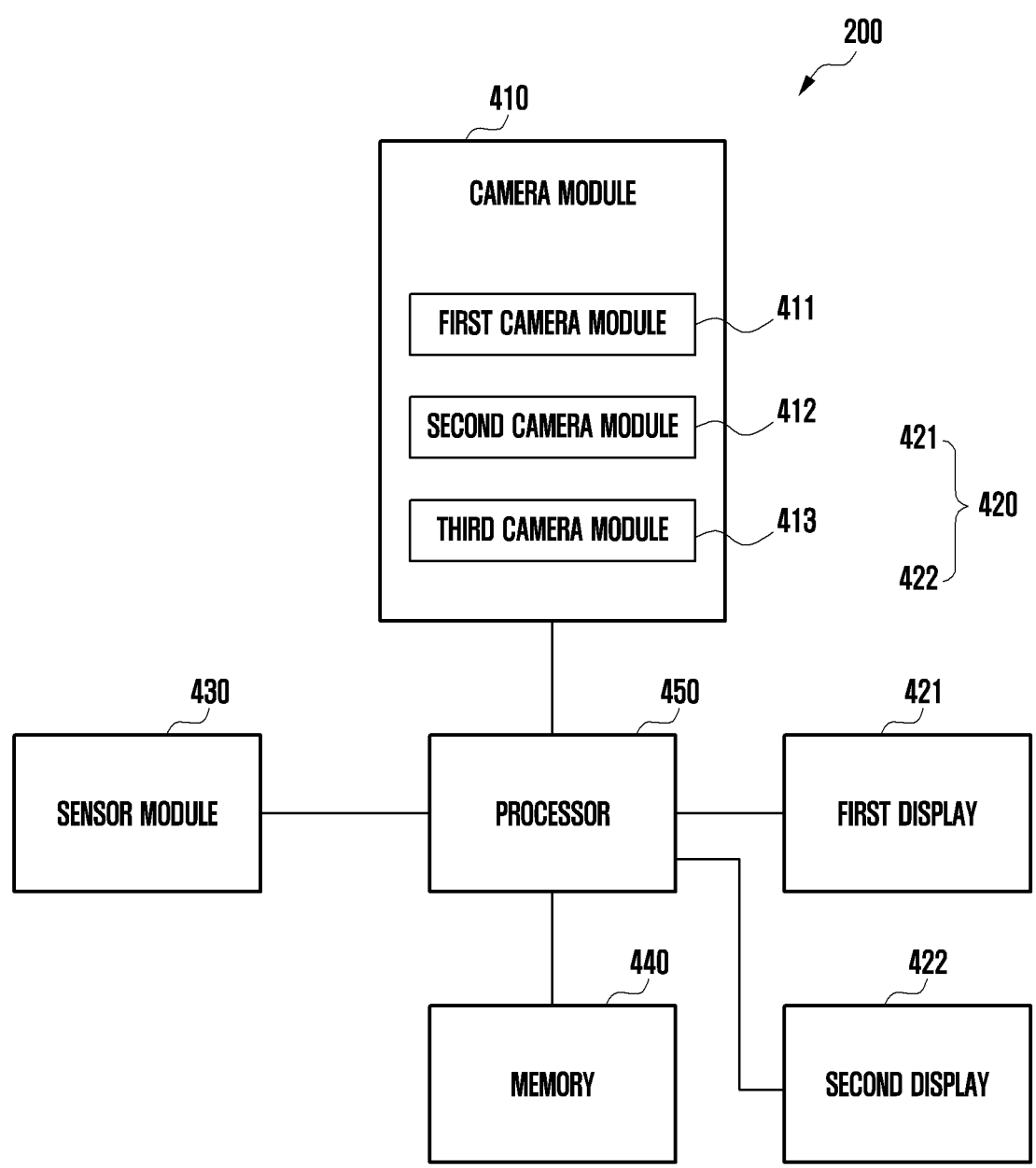
FIG. 4 is a block diagram illustrating an example electronic device according to an embodiment.

FIG. 4 is a block diagram illustrating an example electronic device 200 according to an embodiment.

Referring to FIG. 4, an electronic device (e.g., the electronic device 200 of FIG. 2A) according to an embodiment may include a camera module (e.g., including a camera) 410 (e.g., the camera module 180 of FIG. 1), a display 420 (e.g., the display device 160 of FIG. 1), a sensor module (e.g., including a sensor) 430 (e.g., the sensor module 176 of FIG. 1), a memory 440 (e.g., the memory 130 of FIG. 1), and/or a processor (e.g., including processing circuitry) 450 (e.g., the processor 120 of FIG. 1).

According to an embodiment, the camera module 410 may include a plurality of camera modules each of which may include at least one camera. For example, the camera module 410 may include a first camera module 411 exposed through a first portion of a rear surface of the electronic device 200, for example, the second surface 212 of FIG. 2A, a second camera module 412 exposed through a second portion of a rear surface of the electronic device 200, for example, the fourth surface 222 of FIG. 2A, or a third camera module 413 exposed through a portion of the front surface of the electronic device 200. According to various embodiments, each of the first to third camera modules 411 to 413 may include at least one lens assembly.

According to various embodiments, the first camera module 411, as illustrated in FIGS. 2A and 2B, may be exposed through at least a portion of the second surface (212 of FIG. 2A). For example, the first camera module 411 may be exposed through at least a portion of the second surface (212 of FIG. 2A). According to various embodiments, the second camera module 412, as illustrated in FIGS. 2A and 2B, may be exposed through at least a portion of the fourth surface (222 of FIG. 2A). For example, the second camera module 412 may be exposed through a portion of a surface, on which the second display 422 (e.g., the second display 252 of FIGS. 2A and 2B) is disposed. According to various embodiments, the third camera module 413, as illustrated in FIGS. 2A and 2B, may be exposed through at least a portion of the first surface (211 of FIG. 2A). For example, the third camera module 413 may be exposed through the sensor area (231d of FIG. 2A) illustrated in FIGS. 2A and 2B.

According to an embodiment, the display 420 may include a first display 421 (e.g., the display 230 of FIGS. 2A and 2B) viewable through the front surface of the electronic device 200 and/or a second display 422 (e.g., the display 252 of FIGS. 2A and 2B) viewable through a portion of the rear surface (e.g., the fourth surface 222 of FIG. 2A) of the electronic device 200. According to an embodiment, the first display 421 may be a flexible display that extends from the first surface 211 to the third surface 221 such that at least a portion thereof is folded or foldable. According to an embodiment, the second display 422 may be viewable through at least a portion of the fourth surface (222 of FIG. 2A). According to various embodiments, a hole, through which the second camera module 412 is viewable, may be formed at at least a portion of the second display 422.

According to an embodiment, the sensor module 430 may include at least one sensor and detect a folding state of the foldable housing (e.g., 210 and 220 of FIG. 2A). For example, the sensor module 430 may include a motion sensor or an angle sensor for sensing the angles of the first housing 210 and the second housing 220. According to various embodiment, the sensor module 430 may further include at least one of a Hall sensor for measuring the distance between the first surface 211 and the third surface 221, a proximity sensor, an infrared (IR) sensor, or an illumination sensor.

According to an embodiment, the memory 440 may store a plurality of set values (e.g., a resolution, the size of the display, and the like) for displaying a preview image of a camera module based on the folding state of the foldable housing (e.g., 210 and 220 of FIG. 2A). For example, the memory 440 may store instructions, by which the processor 450 is operated according to the range of an angle defined by the first housing 210 and the second housing 220.

According to an embodiment, the processor 450 may include various processing circuitry and control an overall operation of the electronic device 200. For example, the processor 450 may detect the folding state of the foldable housing (e.g., 210 and 220 of FIG. 2A) using the sensor module 430, generate a preview image based on image information acquired through the camera module based on that fact that the folding state is a predetermined state (e.g., an unfolded state, an intermediate state, or a folded state), and display a preview image by controlling the first display 421 and/or the second display. According to various embodiments, the preview image may be generated by another processor other than the processor 450, for example, an image processing processor (not illustrated). According to various embodiments, the processor 450 may control a display driving IC (DDI) to control the first display 421 and the second display 422. For example, the DDI may independently control the first display 421 and the second display 422.

Figure 5A:
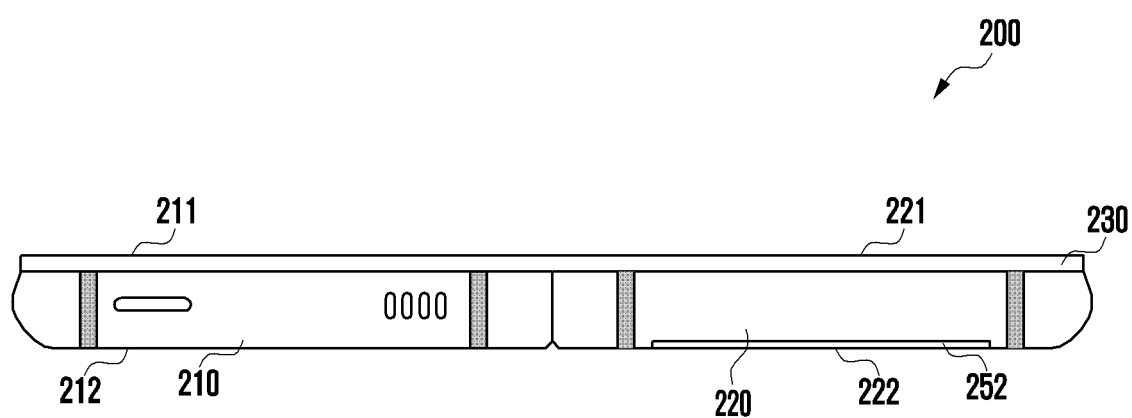
FIG. 5A is a diagram illustrating various example folding states of an electronic device according to an embodiment.
Figure 5B:
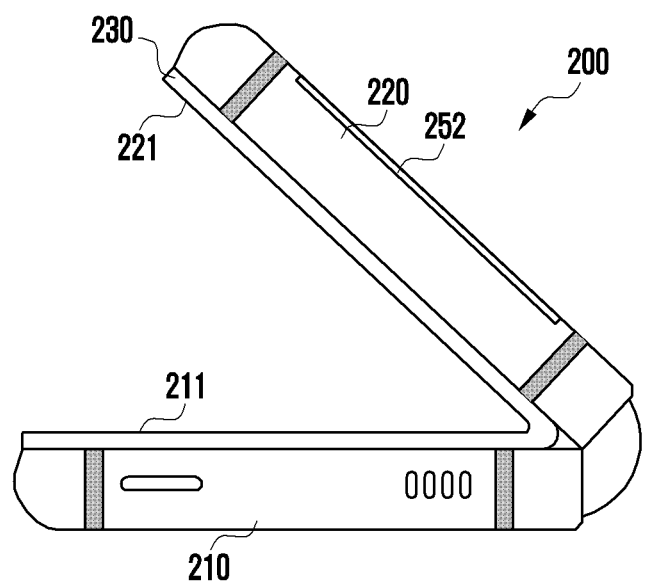
FIG. 5B is a diagram illustrating various example folding states of an electronic device according to an embodiment.
Figure 5C:
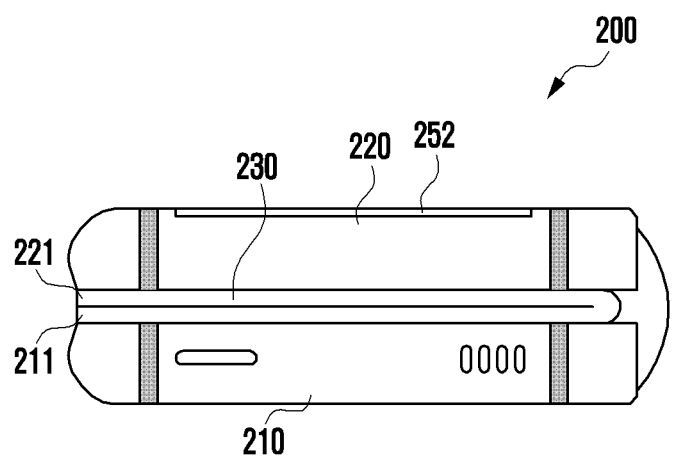
FIG. 5C is a diagram illustrating various example folding states of an electronic device according to an embodiment.

FIGS. 5A, 5B and 5C are diagrams illustrating various example folding states of an electronic device according to an embodiment. For example, FIG. 5A is an example illustrating that the folding state of the electronic device is a first specific state, FIG. 5B is an example illustrating that the folding state of the electronic device is a second specific state, and FIG. 5C is an example illustrating that the folding state of the electronic device is a third specific state.

Referring to FIG. 5A, when the electronic device (e.g., 200 of FIG. 2A) is in an unfolded state (flat state) (e.g., the state of FIG. 2A), the first housing (e.g., 210 of FIG. 2A) and the second housing (e.g., 220 of FIG. 2A) may define a horizontal angle (e.g., 180 degrees) (or between 90 degrees and 270 degrees), and the folding state as in FIG. 5A may be defined as "the first specific state" in the disclosure. According to an embodiment, if the folding state is the first specific state, the first surface (e.g., 211 of FIG. 2A) of the first housing 210 and the third surface (e.g., 221 of FIG. 2A) of the second housing 220 may define a horizontal angle (e.g., 180 degrees). According to an embodiment, when the folding state is the first specific state, the direction of the first display (e.g., 230 of FIG. 2A) and the direction of the second display (e.g., 252 of FIG. 2A) may be opposite to each other.

Referring to FIG. 5B, when the electronic device (e.g., 200 of FIG. 2A) is in an intermediate state, the first housing (e.g., 210 of FIG. 2A) and the second housing (e.g., 220 of FIG. 2A) may be disposed at a certain angle (e.g., between 10 degrees and 90 degrees), and the folding state as in FIG. 5B may be defined as "the second specific state" in the disclosure. According to an embodiment, if the folding state is the first specific state, the first surface (e.g., 211 of FIG. 2A) of the first housing 210 and the third surface (e.g., 221 of FIG. 2A) of the second housing 220 may define a certain angle (e.g., 10 degrees to 90 degrees).

Referring to FIG. 5C, when the electronic device (e.g., 200 of FIG. 2A) is a folded state (e.g., the state of FIG. 2B), the first housing 210 and the second housing 220 may be disposed to face each other, and the folding state as in FIG. 5C may be defined as "the third specific state" in the disclosure. According to an embodiment, if the folding state is the third specific state, the first surface (e.g., 211 of FIG. 2A) of the first housing 210 and the third surface (e.g., 221 of FIG. 2A) of the second housing 220 may define a relatively small acute angle (e.g., between 0 degrees to 10 degrees).

According to various embodiments, in the disclosure, the angle between the first housing 210 and the second housing 220 may refer, for example, to an angle defined by the first surface (e.g., 211 of FIG. 2A) of the first housing 210 and the third surface (e.g., 221 of FIG. 2A) of the second housing 220.

In a method for displaying information by the electronic device (e.g., the electronic device 200 of FIG. 2A) according to various example embodiments, the electronic device 200 may include a first display (e.g., 230 of FIG. 2A), at least a portion of which is foldable, a second display (e.g., 252 of FIG. 2A), and a camera, and the method may include: identifying a folding state of the first display, based on the identified folding state being a first specific state, displaying a first preview image generated based on image information acquired through the camera, through the first display, and displaying a second preview image generated based on the image information through the second display, and an based on the identified folding state being a second specific state, displaying a third preview image generated based on the image information through the second display.

The method may further include generating the first preview image from the first information based on a first resolution of the first display, and generating the second preview image from the first information based on a second resolution of the second display.

The method may further include, based on the folding state being the first specific state, detecting a facial area from the image information, and, based on the facial area being detected, generating the second preview image by cropping at least a portion of the first preview image based on a second resolution of the second display, and wherein the cropped portion includes the facial area.

The first specific state may be a state in which an angle defined by a first portion of the first display and a second portion of the first display may be in a range of about 90 degrees to 270 degrees. The second specific state may be a state in which an angle defined by a first portion of the first display and a second portion of the first display may be in a range of about 0 degrees to 10 degrees.

Figure 6:
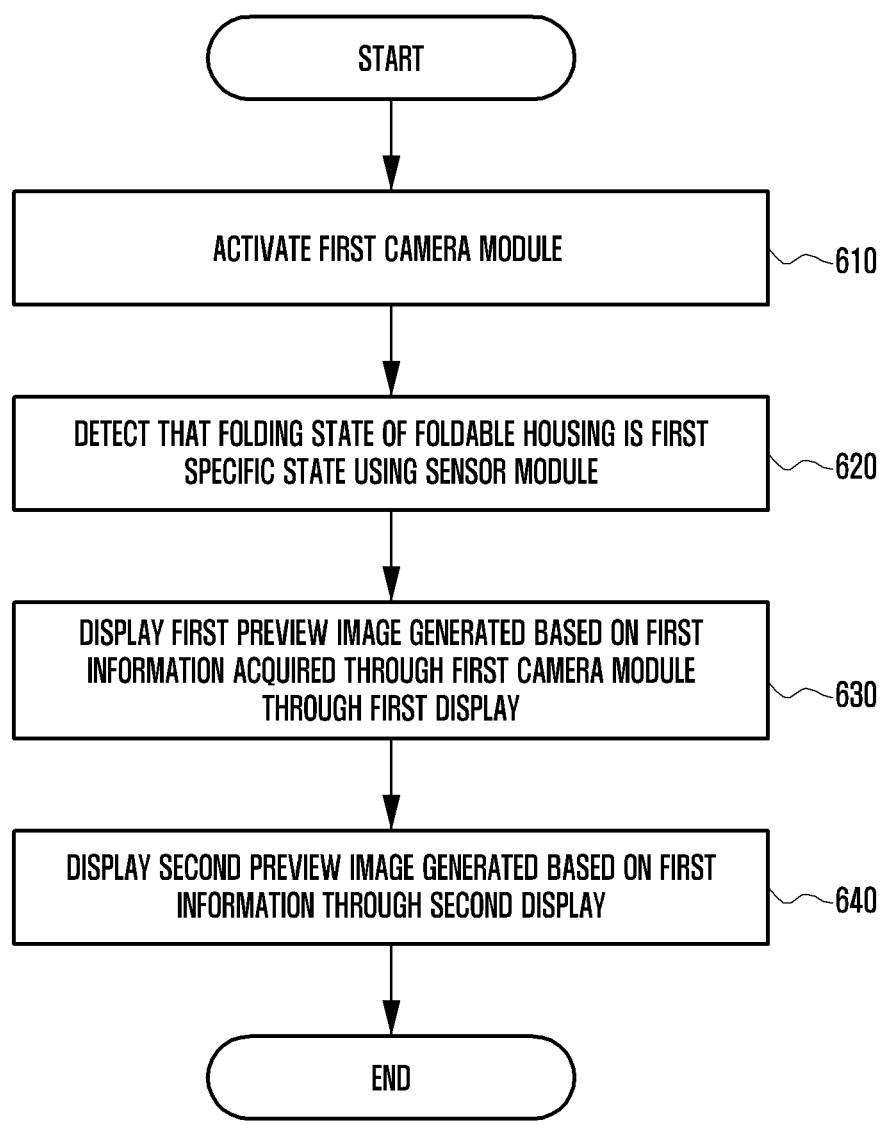
FIG. 6 is a flowchart illustrating an example operation of an electronic device according to an embodiment.
Figure 7:
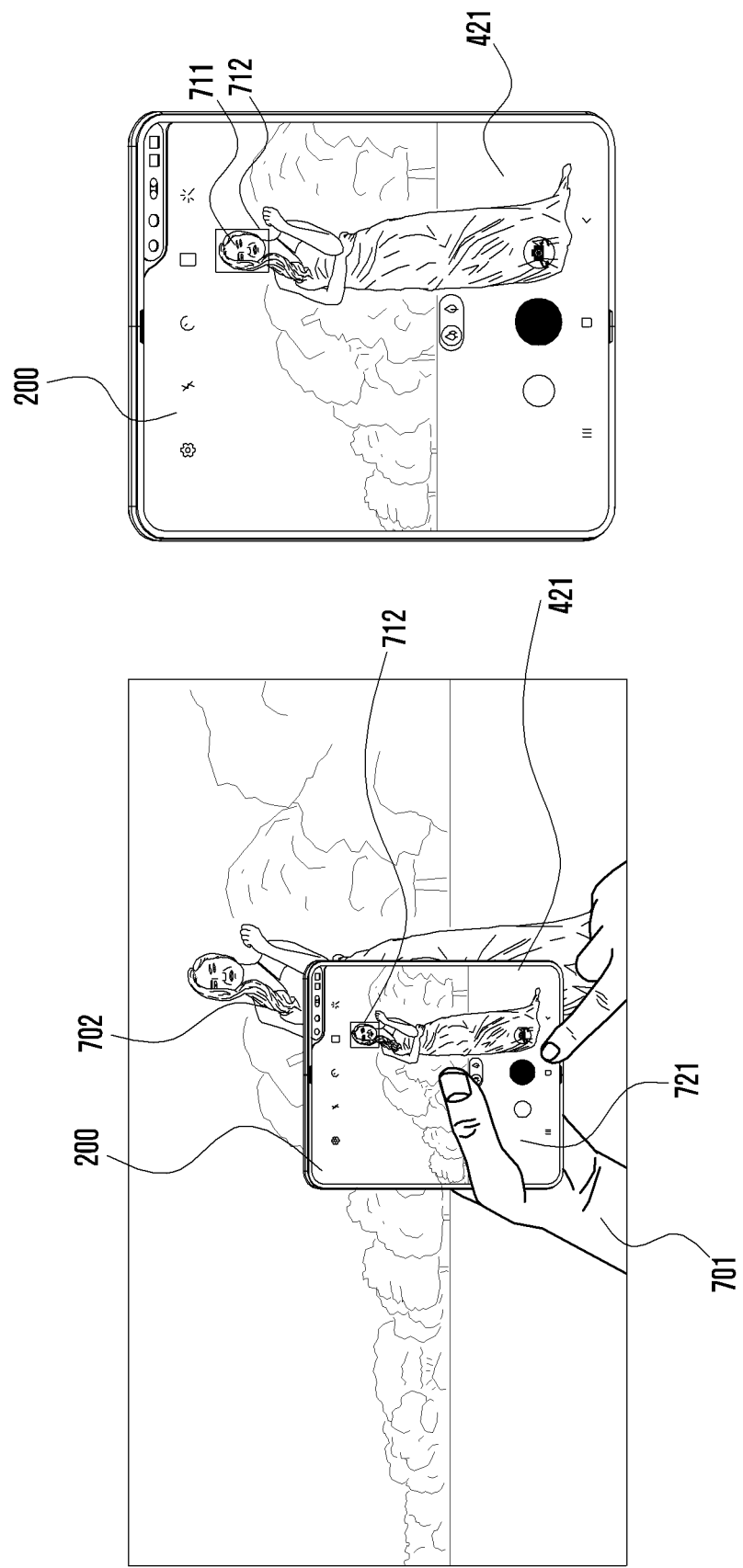
FIG. 7 is a diagram illustrating an example view of a user when the user photographs another user using an electronic device according to an embodiment.
Figure 8:
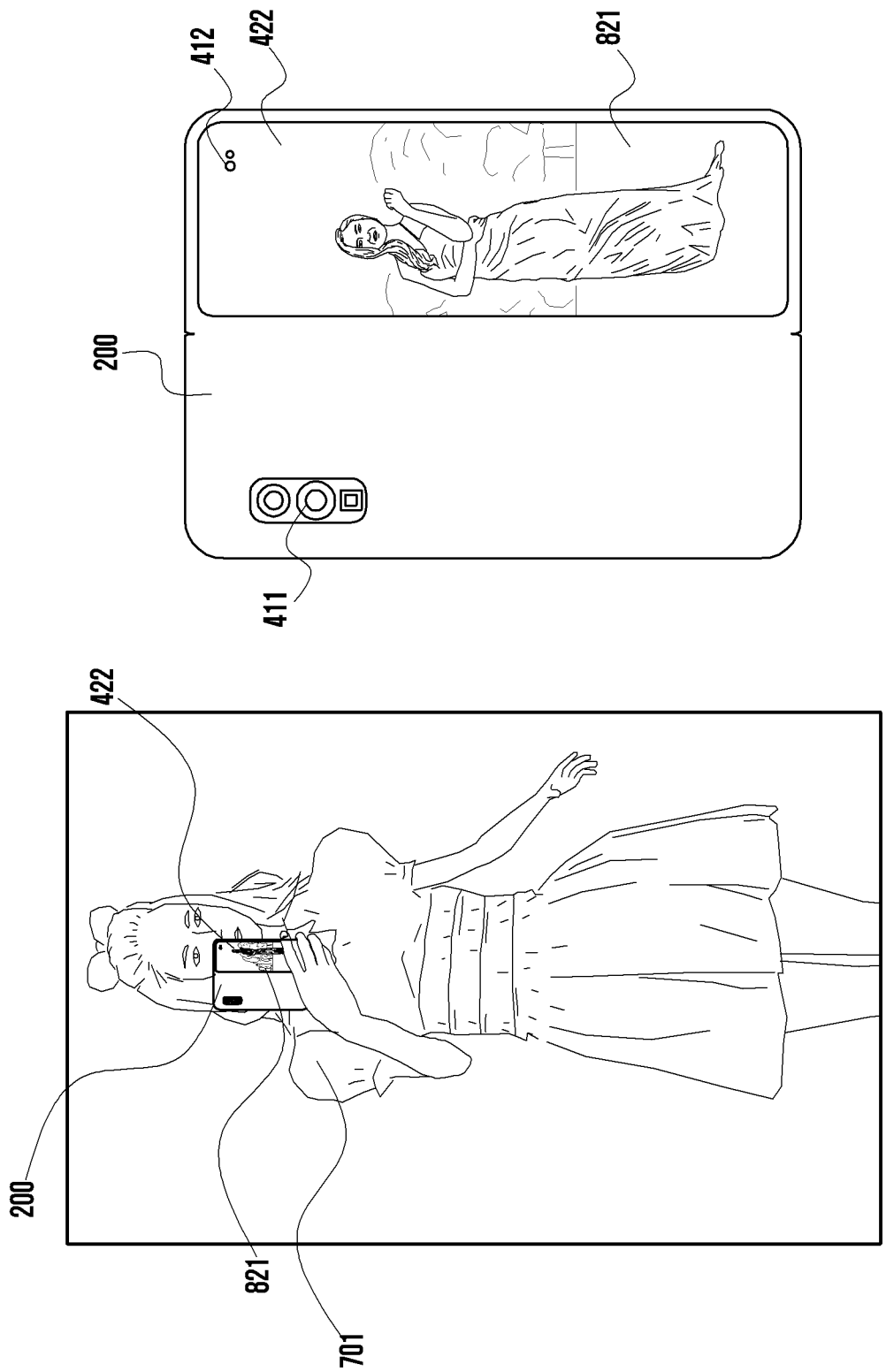
FIG. 8 is a diagram illustrating an example view of another user (e.g., a second user) when a user (e.g., a first user) photographs the another user using an electronic device according to an embodiment.

FIG. 6 is a flowchart illustrating an example operation of an electronic device 200 according to an embodiment. FIG. 7 is a diagram illustrating an example view of another user (e.g., a second user 702) when a user (e.g., a first user 701) photographs the another user using an electronic device 200. FIG. 8 is a diagram illustrating an example view of another user (e.g., a second user 702) when a user (e.g., a first user 701) photographs the another user using an electronic device 200.

Referring to FIG. 6, in operation 610, the electronic device (e.g., the electronic device 200 of FIG. 2A) according to an embodiment may execute a specific application (e.g., a camera module application) based, for example, on a first user input, and activate the first camera module (e.g., the first camera module 411 of FIGS. 2A and 2B). For example, the first user input may be a touch input of selecting an icon of a specific application through a display (e.g., the first display 421 or the second display 422), may be an input of pressing a physical button disposed at at least a portion of the housing (e.g., 210 and 220 of FIG. 2A), or may be an utterance (e.g., "Execute Bixby camera!") of a user through an artificial intelligence service (e.g., Bixby) based on voice recognition. According to various embodiments, the first user input for activating the function of a camera module may be variously changed or modified in addition to the examples.

According to various embodiments, the electronic device 200 may activate another camera module other than the first camera module 411, based on the first user input. For example, the electronic device 200 may activate the second camera module 412 or the third camera module 413 based on the first user input.

According to various embodiments, the electronic device 200 may receive a first user input in various folding states, and may activate the first camera module 411 in response to the first user input. For example, the electronic device 200 may receive the first user input while the foldable housing (e.g., 210 and 220 of FIG. 2A) is in an unfolded state, a folded state, or an intermediate state between the unfolded state and the folded state, and may activate the first camera module 411 in response to the first user input.

In operation 620, the electronic device 200 according to an embodiment may detect that the folding state of the foldable housing (e.g., 210 and 220 of FIG. 2A) is a first specific state (e.g., the state of FIG. 5A or the unfolded state) using the sensor module 430. According to an embodiment, the motion sensor may detect the directions or motions of the surfaces (e.g., 211 and 221 of FIG. 2A) of the foldable housing (e.g., 210 and 220 of FIG. 2A) and deliver the detected motion information to the processor 450. For example, the processor 450 of the electronic device 200 may calculate the angle between the first housing 210 and the second housing 220 using the motion sensor, and may determine whether the folding state of the foldable housing (e.g., 210 and 220 of FIG. 2A) is an unfolded state (e.g., the first specific state), the folded state, or an intermediate state in which the first housing 210 and the second housing 220 define a certain angle based on the calculated angle. According to another embodiment, the electronic device 200 may measure an angle defined by the first housing 210 and the second housing 220 using an angle sensor, and may determine a folding state based on the measured angle.

According to various embodiments, the electronic device 200 may determine the folding state of the foldable housing (e.g., 210 and 220 of FIG. 2A) based on a distance between the first housing 210 and the second housing 220. For example, the electronic device 200 may determine whether the first surface 211 and the third surface 221 are close using a proximity sensor or a Hall sensor, and may determine the folding state of the foldable housing (e.g., 210 and 220 of FIG. 2A). According to various embodiments, the electronic device 200 may determine whether the foldable housing is in the foldable state or the intermediate state and determine that the folding state is in the second specific state if the distance between the first surface 211 and the third surface 221 is smaller than a specific value, and may determine that the folding state is an unfolded state (e.g., the first specific state) if the distance between the first surface 211 and the third surface 221 is greater than the specific value. According to various embodiments, the electronic device 200 may determine the folding state using various sensors. For example, at least one of an infrared (IR) sensor or an illumination sensor may be used.

According to various embodiments, the method for detecting the folding state of the foldable housing (e.g., 210 and 220 of FIG. 2A) by the electronic device 200 may be variously changed or modified.

In operations 630 and 640, if the folding state of the foldable housing (e.g., 210 and 220 of FIG. 2A) is the first specific state (the unfolded state), the electronic device 200 may generate a first preview image 721 based on image information (hereinafter, the first information) acquired through the first camera module 411, the electronic device 200 according to an embodiment may display the first preview image 721 through a first display 421 (e.g., the display 230 of FIGS. 2A and 2B), may generate a second preview image 821 based on the first information, and may display the second preview image 821 through a second display 422 (e.g., the sub-display 252 of FIGS. 2A and 2B). For example, if the folding state is the first specific state, the electronic device 200 may not only activate the first display 421 but also activate the second display 422, and may display a preview image through the first display 421 and the second display 422. For example, as illustrated in FIGS. 7 and 8, the first specific state may be the unfolded state (e.g., an angle defined by the first housing 210 and the second housing 220 is 180 degrees) of the foldable housing (e.g., 210 and 220 of FIG. 2A), and the electronic device 200 may display a preview image through the first display 421 and the second display 422, respectively in the folded state.

According to various embodiments, the first specific state may refer, for example, to a state, in which the angle between the first housing 210 and the second housing 220 is within a first specific range. For example, the electronic device 200 may determine that the folding state is the first specific state when the angle defined by the first housing 210 and the second housing 220 is a value of about 90 degrees to 270 degrees. For example, the first specific state may refer, for example, to a state, in which the angle defined by the first surface (e.g., 211 of FIG. 2A) of the housing 210 and the third surface (e.g., 221 of FIG. 2A) of the second housing 220 is a value of about 90 degrees to 270 degrees.

According to an embodiment, FIG. 7 is an example illustrating a view of another user (e.g., a second user 702) when a user (e.g., a first user 701) photographs the another user using an electronic device 200. The electronic device 200 may provide photographing information to a first user 701 that grips the electronic device 200 by displaying a first preview 721 based on first information acquired using the first camera module 411 through the first display 421. For example, the first user 701 who grips the electronic device 200 may photograph another user (e.g., the second user 702) on the front side while viewing the first preview image 721 including a face 711 of the second user through the first display 421.

According to an embodiment, FIG. 8 illustrates a view, by which the second user 702 views the first user 701 who grips the electronic device 200 when the first user 701 photographs the second user 702, and the electronic device 200 may provide photographing information to the photographed second user 702 by displaying the second preview image 821 based on the first information through the second display 422. For example, the second user 702 who is being photographed may identify his or her facial expression or pose while viewing the second preview image 821 through the second display 422 of the electronic device 200 gripped by the first user 701.

Figure 9:
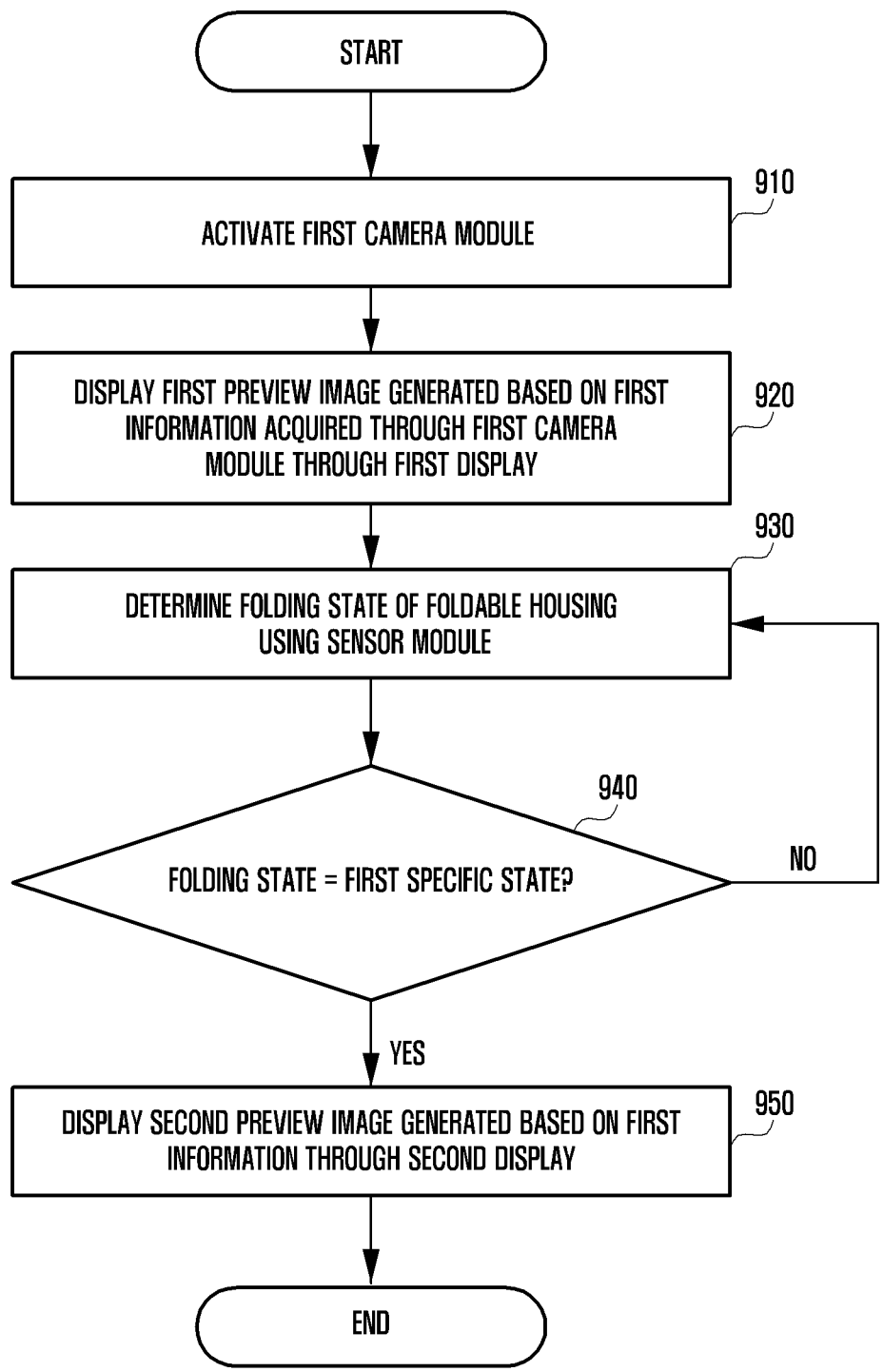
FIG. 9 is a flowchart illustrating an example operation of an electronic device according to an embodiment.

FIG. 9 is a flowchart illustrating an example operation of an electronic device 200 according to an embodiment in more detail.

Referring to FIG. 9, in operation 910, the electronic device (e.g., the electronic device 200 of FIG. 2A) according to an embodiment may execute a specific application (e.g., a camera module application) based on a first user input, and activate the first camera module (e.g., the first camera module 411 of FIGS. 2A and 2B). According to various embodiments, operation 910 may be the same as or similar to operation 610 illustrated in FIG. 6.

In operation 920, the electronic device 200 according to an embodiment may display a first preview image 721 generated based on the image information (first information) acquired through the first camera module 411 through the first display 421 (e.g., the display 230 of FIGS. 2A and 2B). According to various embodiments, operation 920 may be the same as or similar to operation 630 illustrated in FIG. 6.

In operation 930, the electronic device 200 according to an embodiment may determine the folding state of the foldable housing (e.g., 210 and 220 of FIG. 2A) using the sensor module 430 while the first camera module 411 is activated and the first preview image 721 is displayed through the first display 421. For example, the electronic device 200 may determine whether the folding state of the foldable housing (e.g., 210 and 220 of FIG. 2A) is an unfolded state (a flat state or a closed state), a folded state, or an intermediate state, in which the first housing 210 and the second housing 220 define a certain angle, using a motion sensor or an angle sensor.

In operation 940, the electronic device 200 according to an embodiment may identify whether the folding state determined in operation 930 is a first specific state.

In operation 950, if the folding state is the first specific state (e.g., the state of FIG. 5A or the unfolded state) (e.g., the result of operation 940 is "Yes"), the electronic device 200 according to an embodiment may generate a second preview image using the image information (the first information) acquired through the first camera module 411 in operation 910. When the second preview image is generated, it may be generated based on the information of the second display, on which the second preview image is to be displayed. For example, a preview image that is optimized for the resolution of the second display may be generated. The electronic device 200 may display the generated second preview image 821 through the second display 422 (e.g., the sub-display 252 of FIGS. 2A and 2B). According to various embodiments, operation 940 may be the same as or similar to operation 640 illustrated in FIG. 6. For example, if the foldable housing (e.g., 210 and 220 of FIG. 2A) is a first state while the first preview image 721 is displayed, the electronic device 200 may provide photographing information to the second user 702 who is being photographed, by activating the second display 422 and displaying the second preview image 821 through the second display 422.

According to various embodiments, in operation 910, the electronic device 200 may analyze the area (e.g., the facial area) of a human body or the direction of the face from image information (first information) acquired through the first camera module 411, and may determine the intention of the current photographing based on the analysis result. For example, the electronic device 200 may determine whether the photographing is person-centered photographing or scene-centered photographing based on the analysis result.

According to various embodiments, if the facial area is less than a specific value in the analysis result of the image information (the first information) acquired through the first module 411, the electronic device 200 determines that the photographing is scene-centered photographing, and if the facial area is equal to or greater than the specific value, the electronic device 200 determines that the photographing is person-centered photographing. Further, after analyzing the image information (the first information) acquired through the first camera module 411, the electronic device 200 may determine that the photographing is scene-centered photographing if the direction of the face does not face the first camera module 411. The electronic device according to an embodiment may activate the second display 422 when the photographing is person-centered photographing and display a preview image through the second display 422, and may deactivate the second display 422 when the photographing is scene-centered photographing. The electronic device 200 according to various embodiments may regard that the second user 702 who is being photographed is far away if the detected body of a person is small even if the body of the person is detected from the image information (the first information) acquired through the first camera module 411 and deactivate the second display 422.

Figure 10:
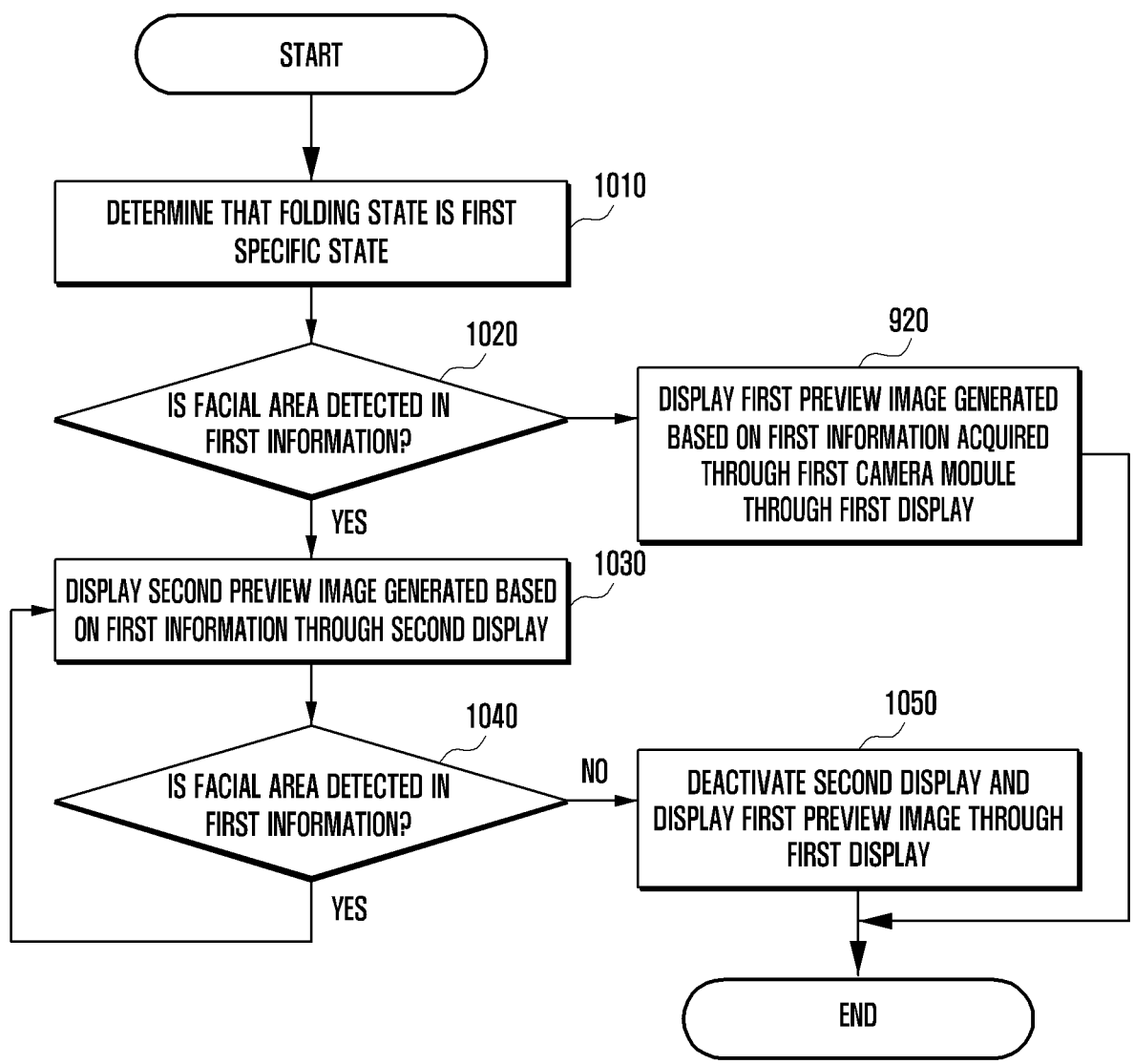
FIG. 10 is a flowchart illustrating an example operation of activating a second display based on detection of a facial area by an electronic device according to an embodiment.

FIG. 10 is a flowchart illustrating an example operation of activating a second display 422 based on detection of a facial area by an electronic device 200 according to an embodiment. According to various embodiments, FIG. 10 may be a flowchart illustrating operation 950 illustrated in FIG. 9.

Referring to FIG. 10, in operation 1010, the electronic device (e.g., the electronic device 200 of FIG. 2A) according to an embodiment may determine that the folding state of the foldable housing (e.g., 210 and 220 of FIG. 2A) is a first specific state using the sensor module 430 while the first camera module (e.g., the first camera module 411 of FIGS. 2A and 2B) is activated and the first preview image 721 is displayed through the first display 421 (e.g., the first display 230 of FIGS. 2A and 2B). According to various embodiments, operation 1010 may be the same as or similar to operation 620 illustrated in FIG. 6.

In operation 1020, the electronic device 200 according to an embodiment may determine whether a specific object is included in the image information (the first information) acquired through the first camera module 411. For example, the electronic device 200 may determine whether a facial area corresponding to a subject is detected from the image information. The specific object may designate information that influences generation of a preview image, which is to be displayed on the second display.

According to an embodiment, it may be determined whether a background screen is included in the image information. According to an embodiment, the electronic device 200 may detect a portion (e.g., a face (e.g., 711 of FIG. 7)) of a body of a subject from the image information (the first information) acquired through the first camera module 411, and may determine a portion corresponding to the face 711 as a facial area (e.g., 712 of FIG. 7) in the image information. According to various embodiments, various known methods may be used as the method for detecting a face from information acquired through a camera module by the electronic device 200.

In operation 1030, the electronic device 200 according to an embodiment may generate a second preview image corresponding to a facial area if the facial area is detected from the first information (e.g., the result of operation 1020 is "Yes"). For example, the electronic device 200 may generate a second preview image by cropping a portion corresponding to the facial area from the first preview image and may generate a second preview image with an optimized image including the face in correspondence to the facial area in the first information. According to various embodiments, the electronic device 200 may generate a second preview image using effects such as various image effects (enlargement of a face, emphasizing of a specific color, change of colorfulness), in addition to the cropping included in the embodiment, when processing an image. The electronic device 200 may display the second preview image 821 generated based on the first information through the second display 422 (e.g., the second display 252 of FIGS. 2A and 2B).

The electronic device 200 according to various embodiments may determine whether the image acquired through the first camera module 411 includes the facial area 712 when the first camera module 411 is activated in the unfolded state. The electronic device 200 may regard that the user (e.g., the first user 701) who grips the electronic device 200 is to photograph another user (e.g., the second user 702) if the facial area 712 is detected from the image acquired through the first camera module 411 and activate the second display 422, and may display the second preview image 821 through the second display 422.

The electronic device 200 according to various embodiments may prevent and/or reduce unnecessary waste of electric power by regarding that there is no subject (e.g., the second user 702) when a facial area 712 is not detected from the image acquired through the first camera module 411 (e.g., the result of operation 1020 is "No") and not activating the second display 422. The electronic device 200 according to various embodiments may activate the first display 421 as in operation 920 of FIG. 9 when a facial area 712 is not detected from the image acquired through the first camera module 411, and may display the first preview image 721 through the first display 421.

In operation 1040, the electronic device 200 according to an embodiment may display the first preview image 721 through the first display 421, and may determine whether the facial area 712 is detected from the first information acquired through the first camera module 411 while the second preview image 821 is displayed through the second display 422. According to various embodiments, operation 1040 may be the same as or similar to operation 1020.

In operation 1050, the electronic device 200 according to an embodiment may display the first preview image 721 through the first display 421, and may deactivate the second display 422 if the facial area 712 is not detected from the first information acquired through the first camera module 411 while the second preview image 821 is displayed through the second display 422 (e.g., the result of operation 1040 is "No") and display the first preview image 721 through the first display 421. The electronic device 200 according to various embodiments may prevent and/or reduce unnecessary waste of electric power by regarding that there is no subject (e.g., the second user 702) when a facial area 712 is not detected from the image acquired through the first camera module 411 (e.g., the result of operation 1020 is "No") and not activating the second display 422.

Figure 11:
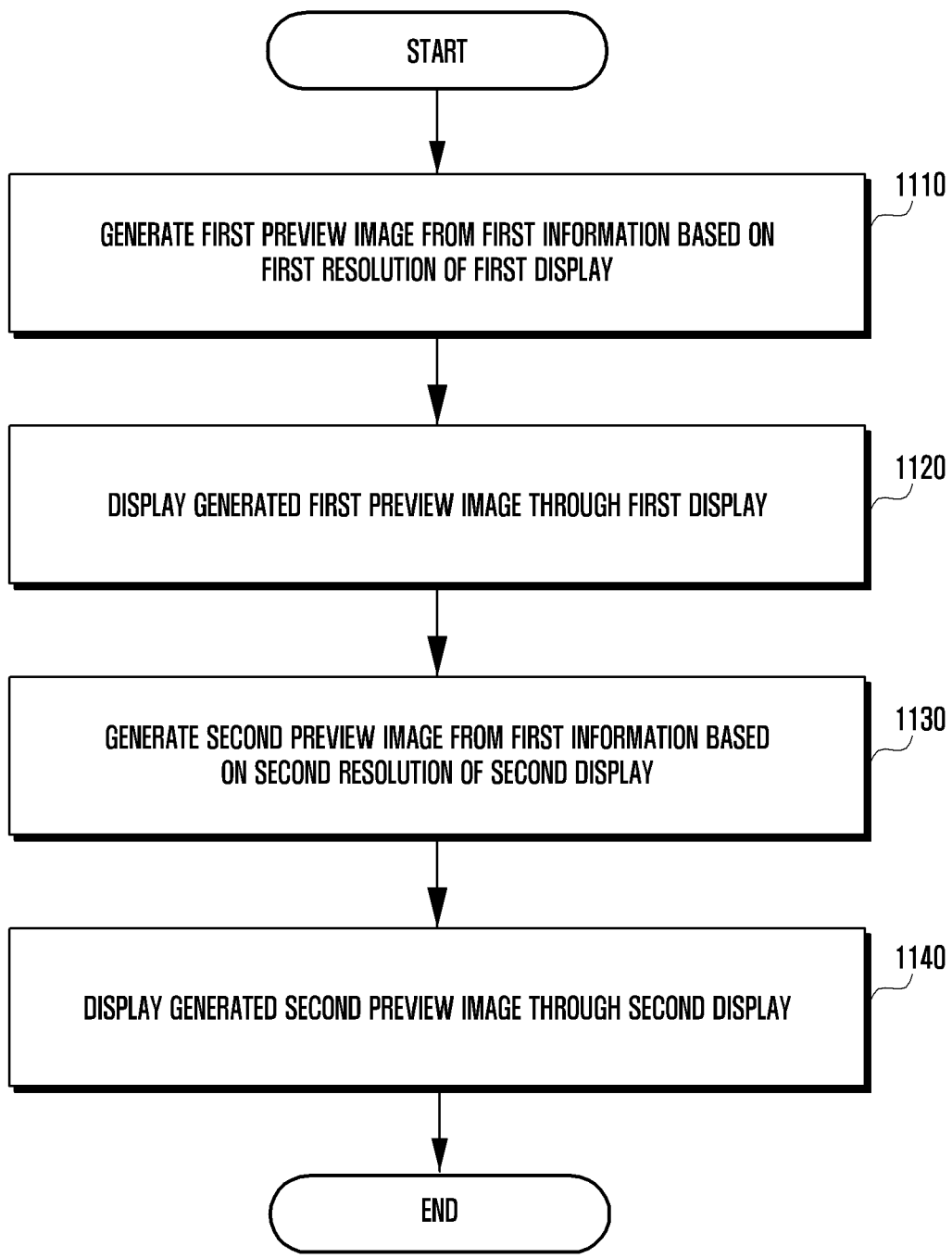
FIG. 11 is a flowchart illustrating an example operation of an electronic device, in which a method for generating a second preview image is illustrated, according to an embodiment.
Figure 12:
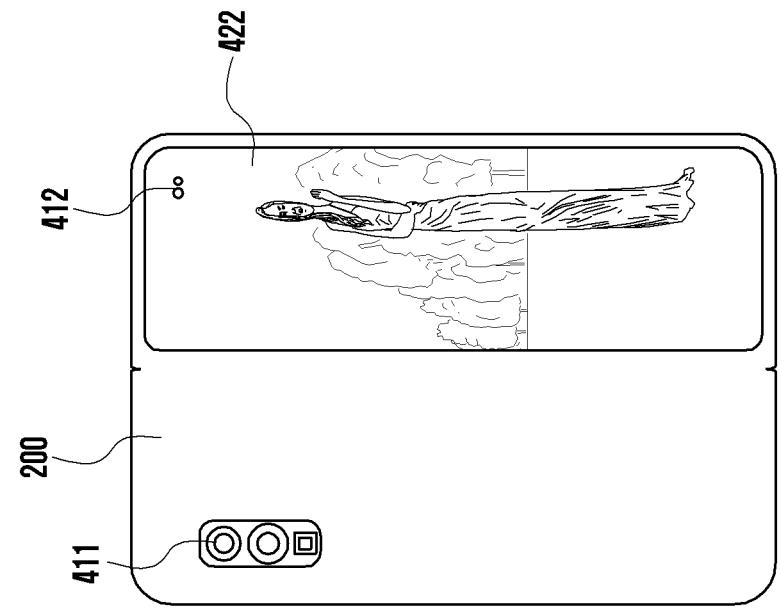
FIG. 12 is a diagram illustrating an example of a first preview image and a second preview image according to an embodiment.
Figure 12:
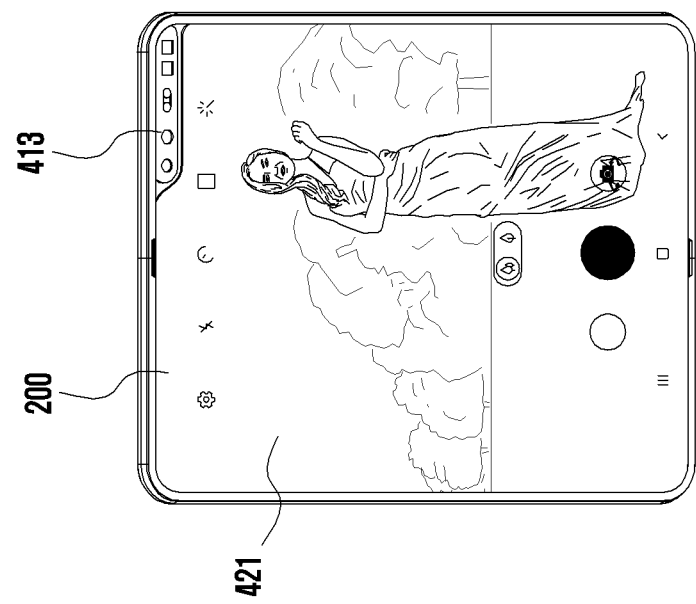

FIG. 11 is a flowchart illustrating an example operation of an electronic device 200, in which a method for generating a second preview image 821 is described, according to an embodiment. FIG. 12 is a diagram illustrating an example of a first preview image 721 (see, e.g., FIG. 7) and a second preview image 821 (see, e.g., FIG. 8) according to an embodiment.

According to various embodiments, FIG. 11 may be a flowchart illustrating operation 640 illustrated in FIG. 6, operation 950 illustrated in FIG. 9, and operation 1030 illustrated in FIG. 10.

In operations 1110 and 1120, the electronic device (e.g., the electronic device 200 of FIG. 2A) according to an embodiment may identify display information (e.g., a resolution) of the first display 421 (e.g., the display 230 of FIGS. 2A and 2B) and may generate a preview image based on the identified resolution. For example, when the first resolution of the first display is identified, the first preview image 721 may be generated based on the first resolution. For example, the electronic device 200 may generate a first preview image 721 of a ratio of 3:4 corresponding to the first display 421 from the first information, and may display the generated first preview image 721 through the first display 421.

In operations 1130 and 1140, the electronic device 200 according to an embodiment may generate a second preview image 821 based on a second resolution of the second display 422 (e.g., the sub-display 252 of FIGS. 2A and 2B). For example, as illustrated in FIG. 12, the electronic device 200 may generate a first preview image 721 of a ratio of 4:3 corresponding to the first display 421 and a second preview 821 of a ratio of 16:9 corresponding to the second display 422 from the first information, may display the generated first preview image 721 through the first display 421, and may display the generated second preview image 821 through the second display 422.

Figure 13:
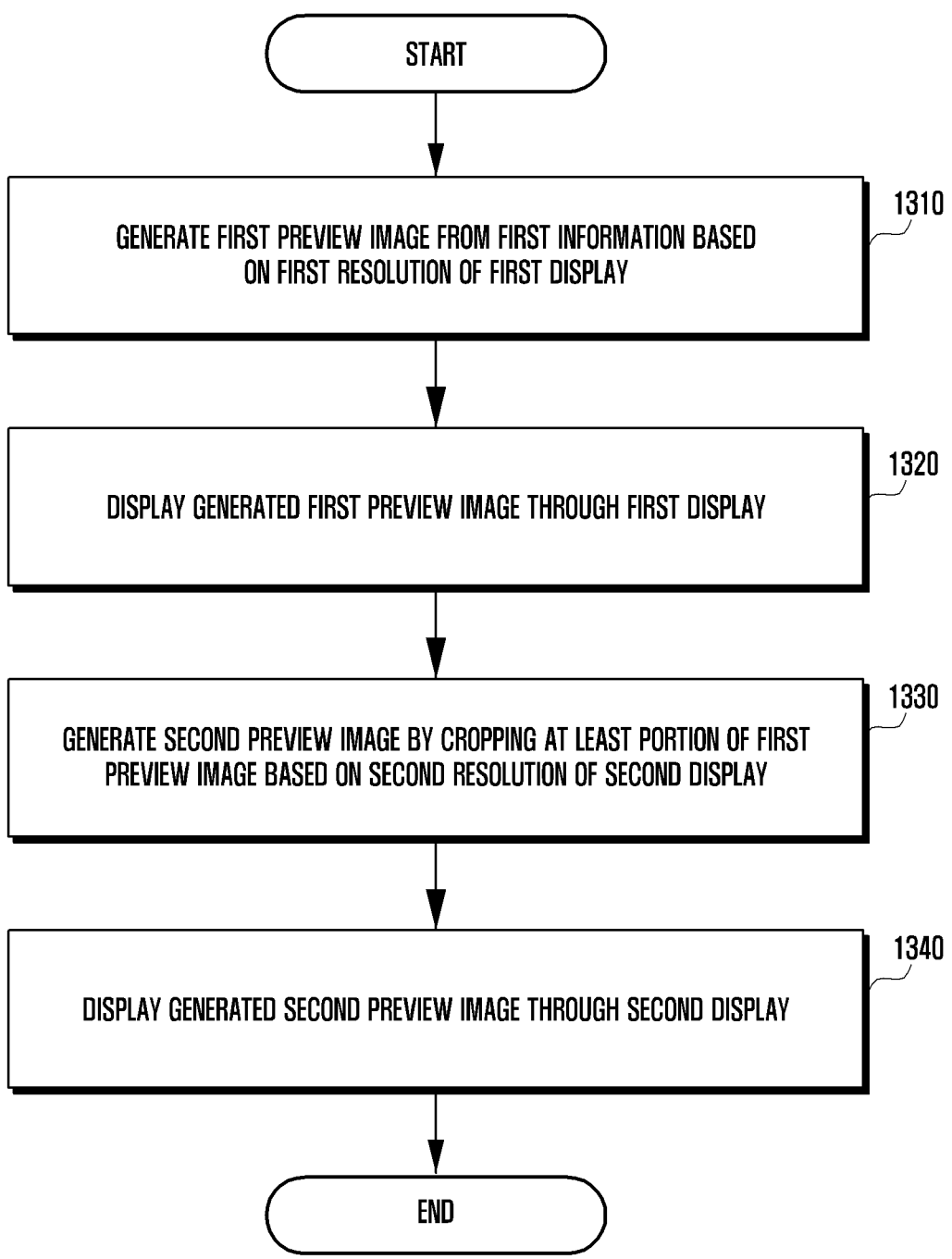
FIG. 13 is a flowchart illustrating an example operation of an electronic device, in which a method for generating a second preview image is illustrated, according to an embodiment.
Figure 14:
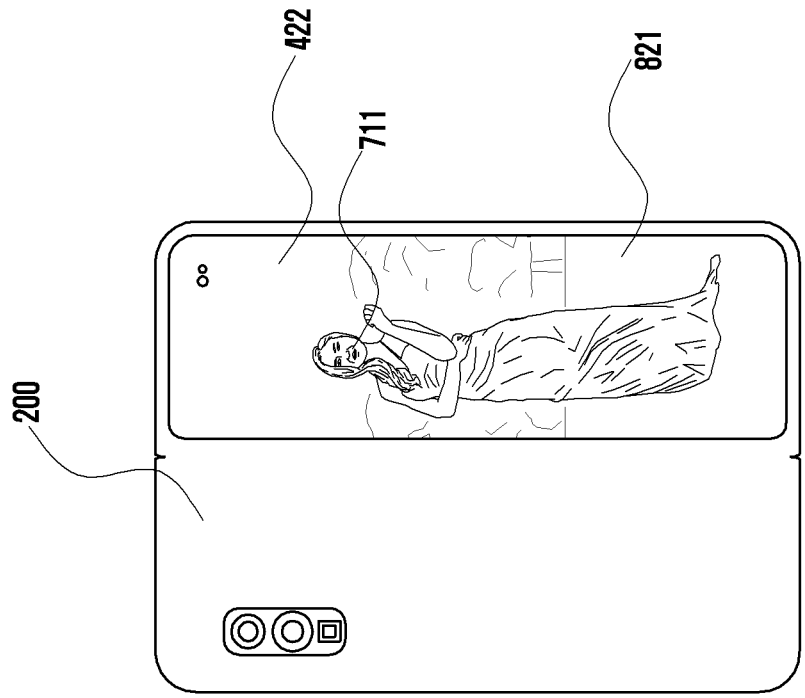
FIG. 14 is a diagram illustrating an example of a first preview image and a second preview image according to another embodiment.
Figure 14:
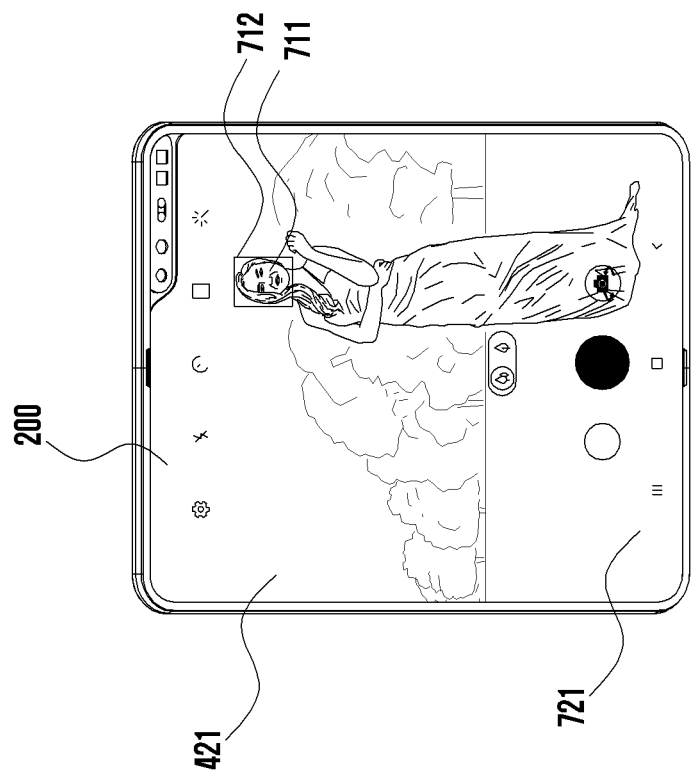

FIG. 13 is a flowchart illustrating an example operation of an electronic device 200, in which a method for generating a second preview image 821 is described, according to another embodiment. FIG. 14 is a diagram illustrating an example of a first preview image 721 and a second preview image 821 according to another embodiment.

According to various embodiments, FIG. 13 may be another flowchart illustrating operation 640 illustrated in FIG. 6, operation 950 illustrated in FIG. 9, and operation 1030 illustrated in FIG. 10.

In operations 1310 and 1320, the electronic device (e.g., the electronic device 200 of FIG. 2A) according to the another embodiment may generate the first preview image 721 that is to be displayed on the first display 421 (e.g., the display 230 of FIGS. 2A and 2B).

In operations 1330 and 1340, the electronic device 200 according to the another embodiment may generate the first preview image 721 though image conversion. For example, through the image conversion, the second preview image may be generated by adding image processing, such as change of colorfulness, brightness, color, a subject face changing effect, or cropping of at least a portion of the image. According to an embodiment, the electronic device 200 may generate the second preview mage by image-processing image information directly acquired from the camera module in addition to the first preview image 721. According to various embodiments, as illustrated in FIG. 14, the electronic device 200 may detect a portion of a human body (e.g., the face 711) and an area including the portion of the human body, for example, the facial area 712 from the first information acquired through the first camera module 411 or the first preview image 721, and may generate the second preview image 821 by cropping a portion of the preview image 721 including the facial area 712. The electronic device 200 according to various embodiments may easily identify the facial expression or pose of the photographed person (e.g., the second user 702) through the second display 422 by the photographed person by cropping a portion of the facial area 712 from the first preview image 721 and generating the second preview image 821.

Figure 15:
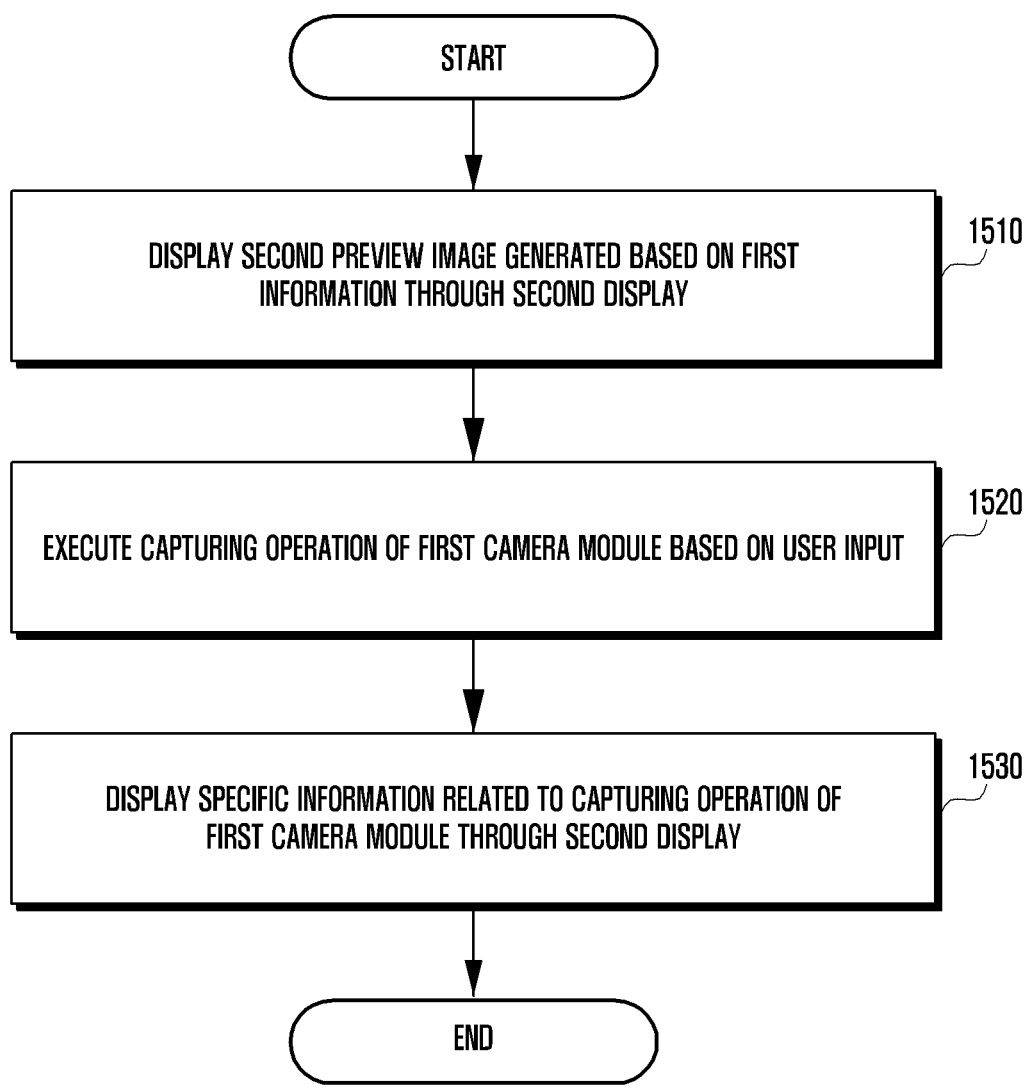
FIG. 15 is a flowchart illustrating an example operation of displaying information related to capturing of a camera module through a second display by an electronic device according to an embodiment.
Figure 16:
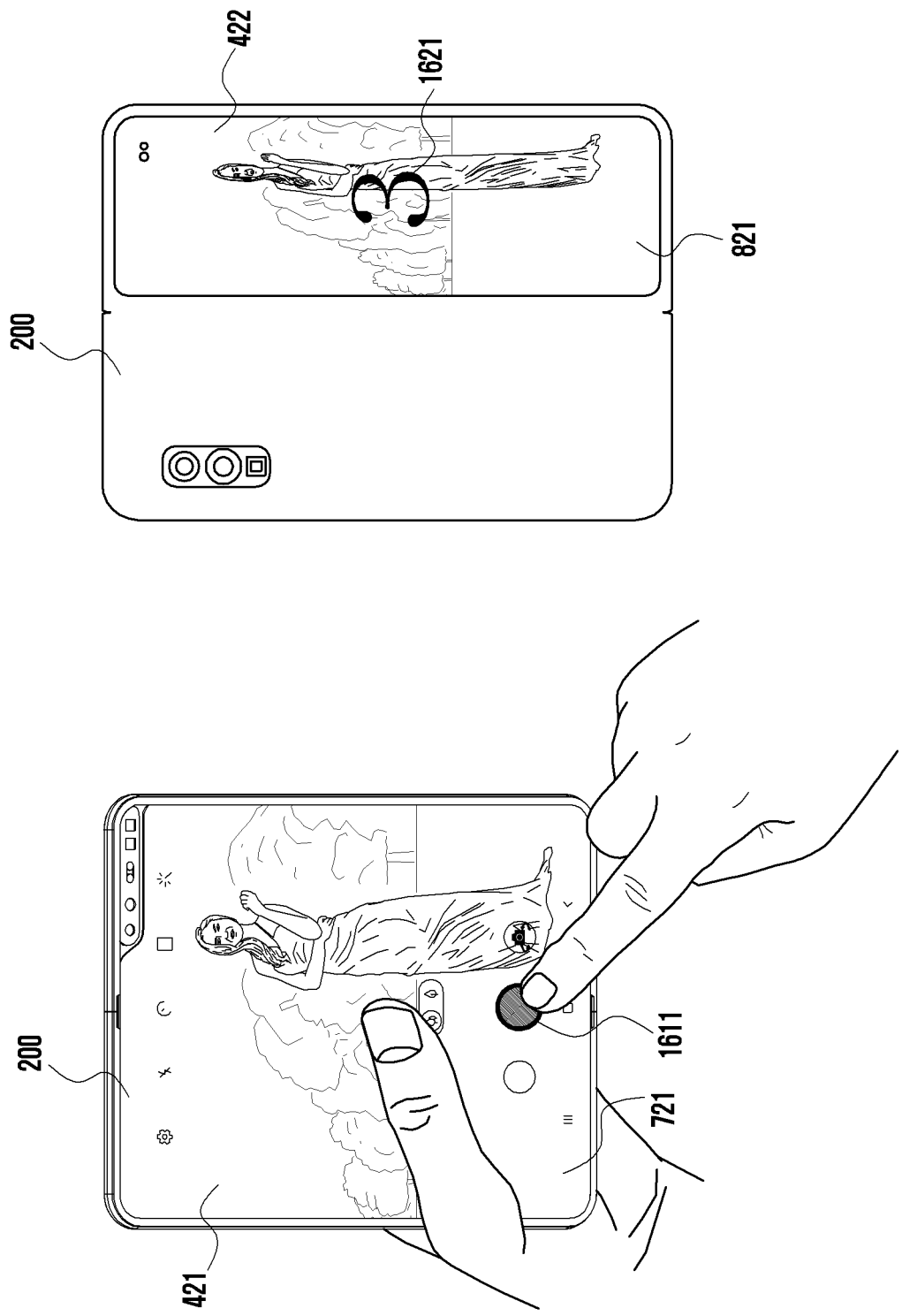
FIG. 16 is a diagram illustrating an example state, in which information related to capturing of a camera module is displayed through a second display by an electronic device according to an embodiment.

FIG. 15 is a flowchart illustrating an example operation of displaying information related to capturing of a camera module through a second display 422 by an electronic device 200 according to an embodiment. FIG. 16 is a diagram illustrating an example state of displaying information related to capturing of a camera module through a second display 422 by an electronic device 200 according to an embodiment.

According to various embodiments, FIG. 15 may be a flowchart illustrating an operation after operation 640 illustrated in FIG. 6, operation 950 illustrated in FIG. 9, and operation 1030 illustrated in FIG. 10.

In operation 1510, the electronic device (e.g., the electronic device 200 of FIG. 2A) according to an embodiment may display the second preview image 821 based on the first information acquired from the first camera module (e.g., the first camera module 411 of FIGS. 2A and 2B) in the unfolded state of the foldable housing (e.g., 210 and 220 of FIG. 2A) through the second display 422 (e.g., the sub-display 252 of FIGS. 2A and 2B). According to various embodiments, operation 1510 may be the same as or similar to operation 640 illustrated in FIG. 6, operation 950 illustrated in FIG. 9, and operation 1030 illustrated in FIG. 10.

In operation 1520, the electronic device 200 according to an embodiment may execute a photographing (capturing) operation of the first camera module 411 based on a user input (e.g., the second user input). For example, as illustrated in FIG. 16, the electronic device 200 may execute a capturing operation of the first camera module 411 based on a user input 1611 of touching a specific object (e.g., a capture icon) through the first display 421 (e.g., the display 230 of FIGS. 2A and 2B). According to another embodiment, the electronic device 200 may execute a capturing operation of the first camera module 411 based on a pressure that presses a physical button disposed at at least a portion of the housing (e.g., 210 and 220 of FIG. 2A). According to another embodiment, the electronic device 200 may execute an operation of capturing the first camera module 411 on the basis of an utterance (e.g., "Capture Bixby camera module") of the user through an artificial intelligence service (e.g., Bixby) based on voice recognition.

In operation 1530, the electronic device 200 according to an embodiment may display specific information related to the capturing operation through the second display 422 if the capturing operation of the first camera module 411 is executed. According to various embodiments, the information may be a timer (e.g., 3-2-1-shooting) as in 1621 of FIG. 16. According to various embodiments, the specific information may be various pieces of visual information (e.g., an icon or a character image) or audible information for informing the photographed person of the execution of the capturing operation and for example, may be a sound such as cheese or smile.

According to various embodiments, the electronic device 200 may display a synthesized screen for providing a fun experience to the user through the second display 422 if the capturing operation of the first camera module 411 is executed. For example, the electronic device 200 may provide a fun experience to the photographed person (e.g., the second user 702) by synthesizing an augmented reality (AR) image with the second preview image 821 if the capturing operation of the first camera module 411 is executed and displaying the synthesized screen through the second display 422.

Figure 17:
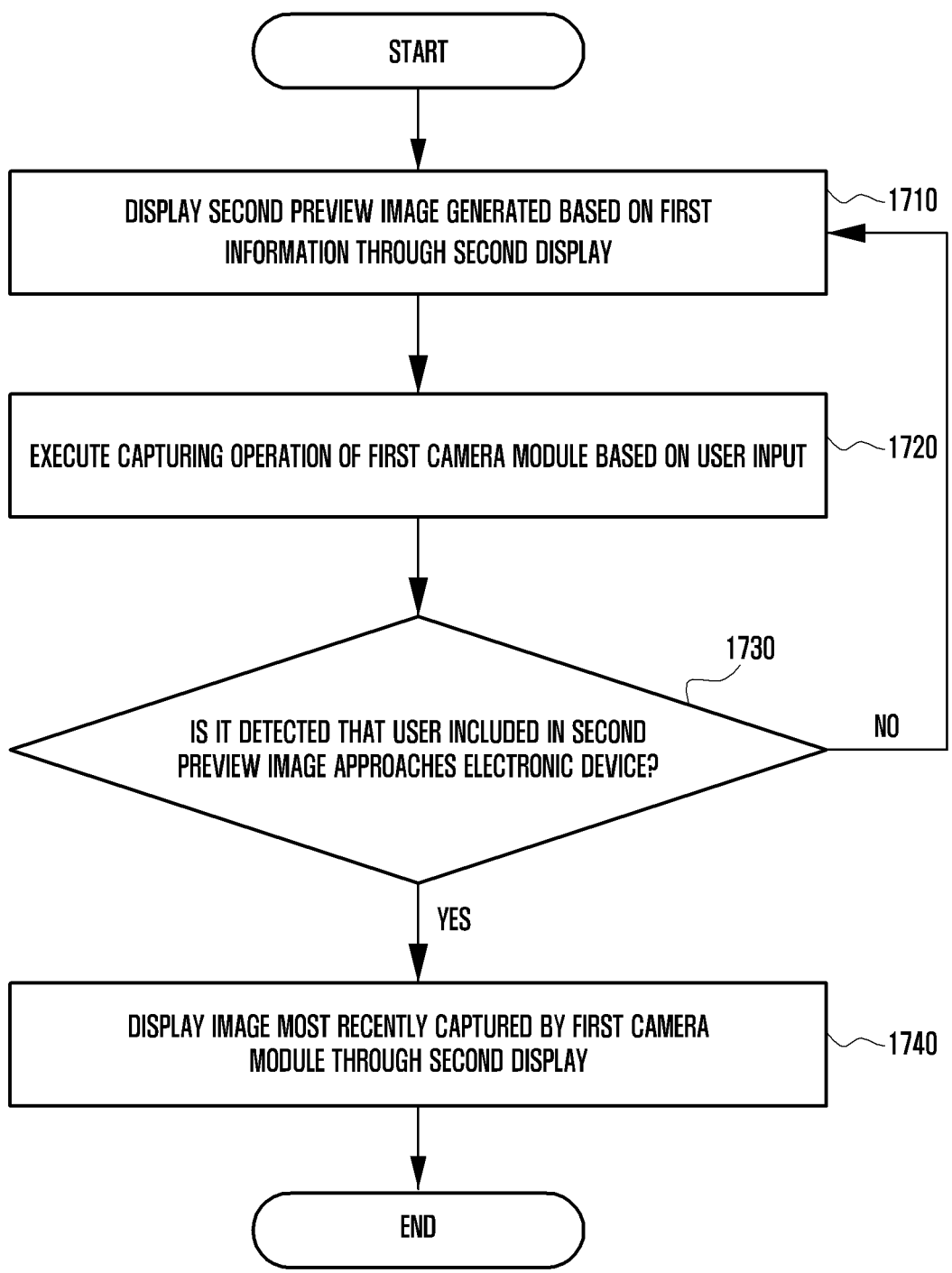
FIG. 17 is flowchart illustrating an example operation of displaying a captured image based on detection of an approach of a photographed user (e.g., a second user) by an electronic device according to an embodiment.
Figure 18:
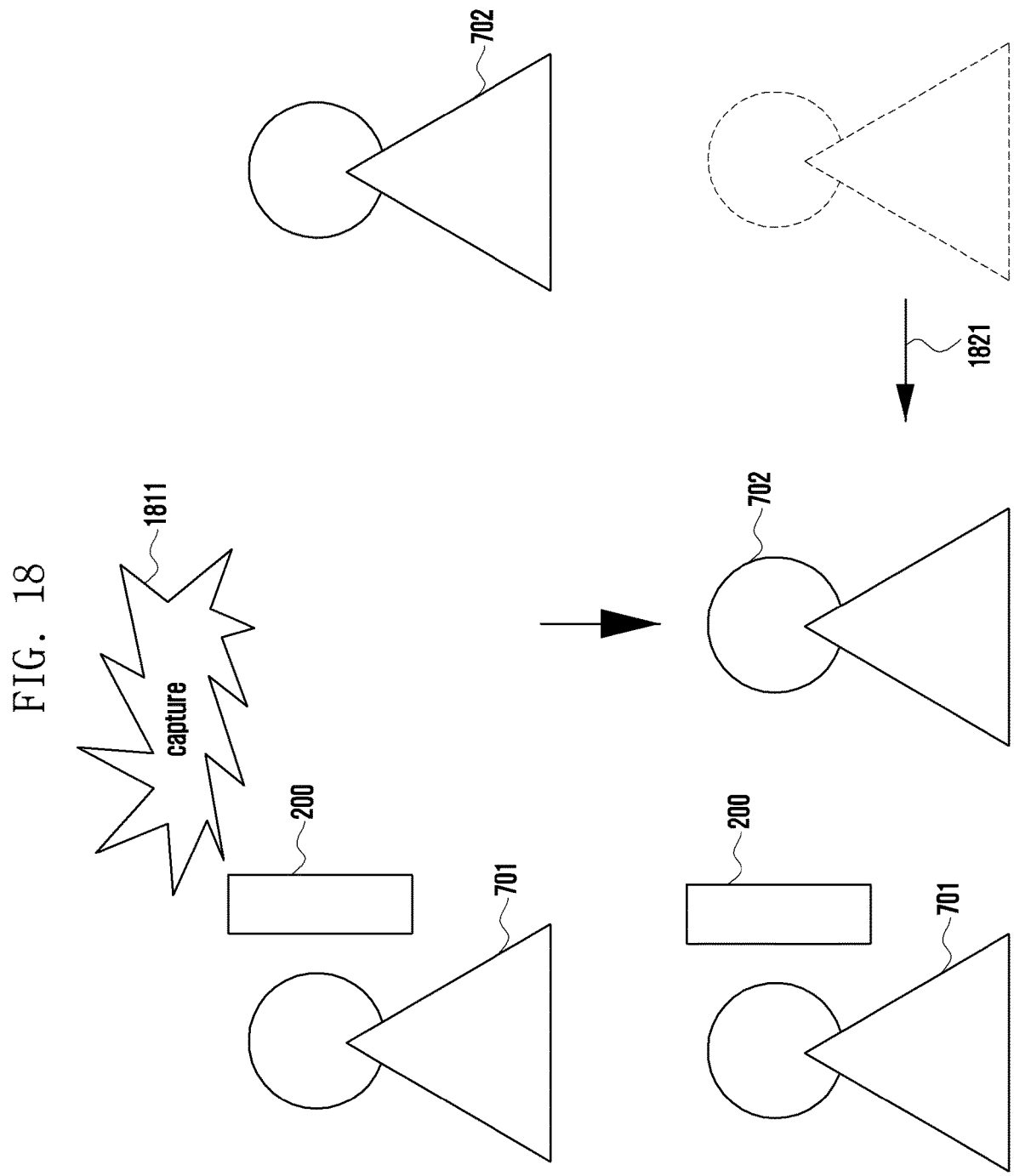
FIG. 18 is a diagram illustrating an example approach of a user (e.g., a second user) according to an embodiment.
Figure 19:
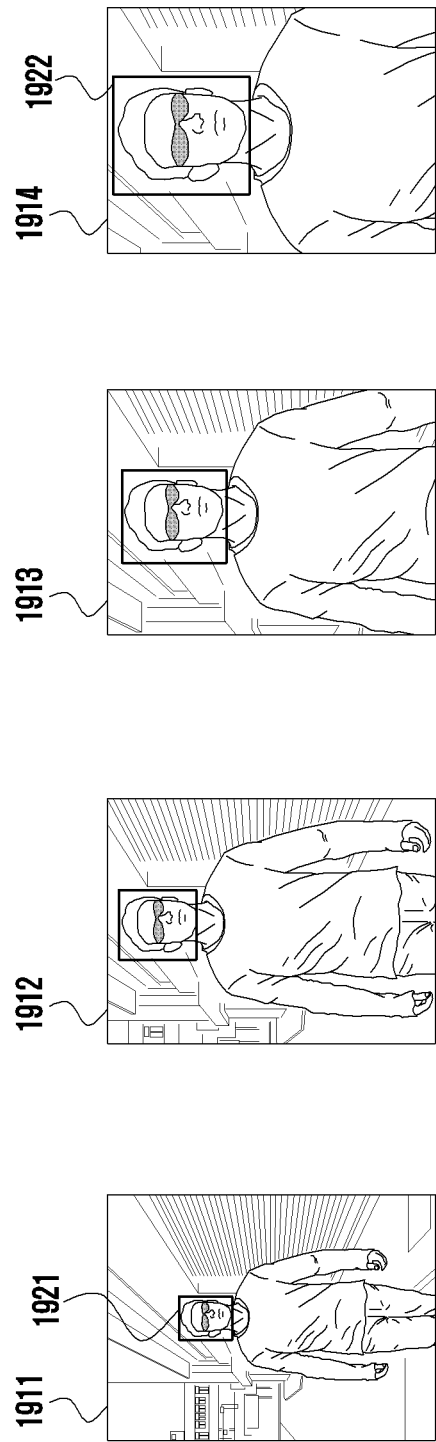
FIG. 19 is a diagram illustrating an example change in a first preview image based on an approach of a photographed user (e.g., a second user) according to an embodiment.

FIG. 17 is a flowchart illustrating an example operation of displaying a captured image based on detection of an approach of a photographed user (e.g., a second user 702) by an electronic device 200 according to an embodiment. FIG. 18 is a diagram illustrating an example approach of a photographed user (e.g., a second user 702). FIG. 19 is a diagram illustrating an example change in a first preview image 721 according to approach of a photographed user (e.g., a second user 702).

According to various embodiments, FIG. 17 may be a flowchart illustrating an operation after operation 640 illustrated in FIG. 6, operation 950 illustrated in FIG. 9, and operation 1030 illustrated in FIG. 10.

In operation 1710, the electronic device (e.g., the electronic device 200 of FIG. 2A) according to an embodiment may display the second preview image 821 based on the first information acquired from the first camera module (e.g., the first camera module 411 of FIGS. 2A and 2B) in the unfolded state of the foldable housing (e.g., 210 and 220 of FIG. 2A) through the second display 422 (e.g., the sub-display 252 of FIGS. 2A and 2B). According to various embodiments, operation 1710 may be the same as or similar to operation 640 illustrated in FIG. 6, operation 950 illustrated in FIG. 9, and operation 1030 illustrated in FIG. 10.

In operation 1720, the electronic device 200 according to an embodiment may execute a capturing operation of the first camera module 411 based on a user input. According to various embodiments, operation 1720 may be the same as or similar to operation 1520 illustrated in FIG. 15.

In operation 1730, the electronic device 200 according to an embodiment may determine whether the user included in the second preview image 821 approaches the electronic device 200. For example, as illustrated in FIG. 18, the electronic device 200 may determine whether the photographed person (e.g., the second user 702) on the front side approaches (e.g., 1821 of FIG. 18) the electronic device 200 after executing the capturing operation of the first camera module 411 (e.g., 1811 of FIG. 18).

According to various embodiments, the electronic device 200 may determine whether the second user 702 approaches the electronic device 200 based on the result obtained by analyzing the first information acquired through the first camera module 411. For example, the electronic device 200, as illustrated in FIG. 19, may detect a portion (e.g., a facial area 1921 and 1922 or a portion of the human body) of the second user from the first information (or the first preview image 721) and may calculate a relative extent of the detected area. The electronic device 200 according to an embodiment may determine that the photographed person (e.g., the second user 702) approaches the electronic device 200 after the photographing operation if the extent of the area of a portion of the human body gradually increases after the capturing operation of the first camera module 411 is executed. For example, the electronic device 200 may detect a facial area from a plurality of pieces of first information 1911, 1912, 1913, and 1914 acquired in time sequences after the capturing operation of the first camera module 411 is executed, and may determine that the photographed person (e.g., the second user 702) approaches the electronic device 200 after the capturing operation if the extents of the detected facial areas gradually increase.

According to an embodiment, the electronic device 200 may set an extent of a facial area 1921 to a reference extent at a capture time point of the first camera 411. The electronic device 200 may determine that the photographed person (e.g., the second user 702) approaches the electronic device 200 after the photographing operation if the extent of the facial area increases to a specific ratio or more as compared with the reference extent as in 1922 of FIG. 19 after the capturing operation. According to various embodiments, the method for determining whether the photographed person (e.g., the second user 702) approaches the electronic device 200 after the photographing operation may be modified and changed in various methods in addition to the method for calculating the extent of the facial area. For example, the electronic device 200 may determine whether the photographed person (e.g., the second user 702) on the front side approaches the electronic device 200 after the photographing operation using an infrared (IR) sensor or a depth (time-of-flight (ToF)) camera module.

In operation 1740, the electronic device 200 according to an embodiment may display the most recently photographed (captured) image through the first camera module 411 through the second display 422 in a state in which the user has approached the electronic device 200 (e.g., the result of operation 1730 is "Yes"). For example, the electronic device 200 may display the most recently photographed (captured) image through the second display 422 such that the photographed person (e.g., the second user 702) may identify an image (a video) captured by the photographed person if the photographed person (e.g., the second user 702) approaches the electronic device 200 after the capturing operation of the first camera module 411 is executed.

According to various embodiments, if the photographed person (e.g., the second user 702) becomes far away from the electronic device 200 again after the most recently photographed (captured) image is displayed through the second display 422, the electronic device 200 may convert the screen of the second display 422 from the recently photographed (captured) image to the second preview image 821. The method for detecting whether the photographed person (e.g., the second user 702) becomes far away from the electronic device 200 again by the electronic device 200 according to various embodiments may be similar to the method of operation 1730. For example, the electronic device 200 may determine that the photographed person (e.g., the second user 702) becomes far away from the electronic device 200 if the facial area detected from the first information gradually decreases. According to another embodiment, For example, the electronic device 200 may determine whether the photographed person (e.g., the second user 702) on the front side becomes far away from the electronic device 200 using an infrared (IR) sensor or a depth (time-of-flight (ToF)) camera module.

Figure 20:
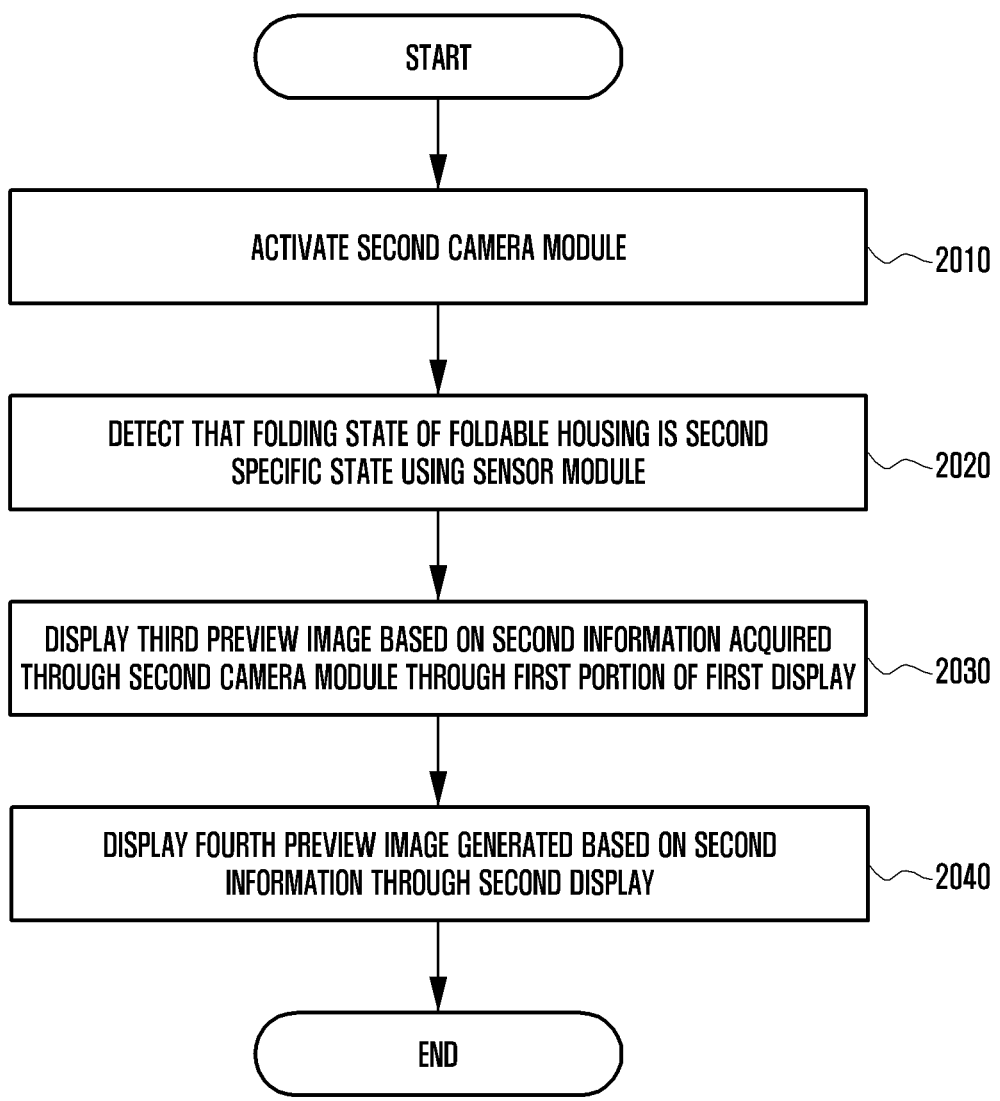
FIG. 20 is a flowchart illustrating an example operation of an electronic device according to an embodiment.
Figure 21:
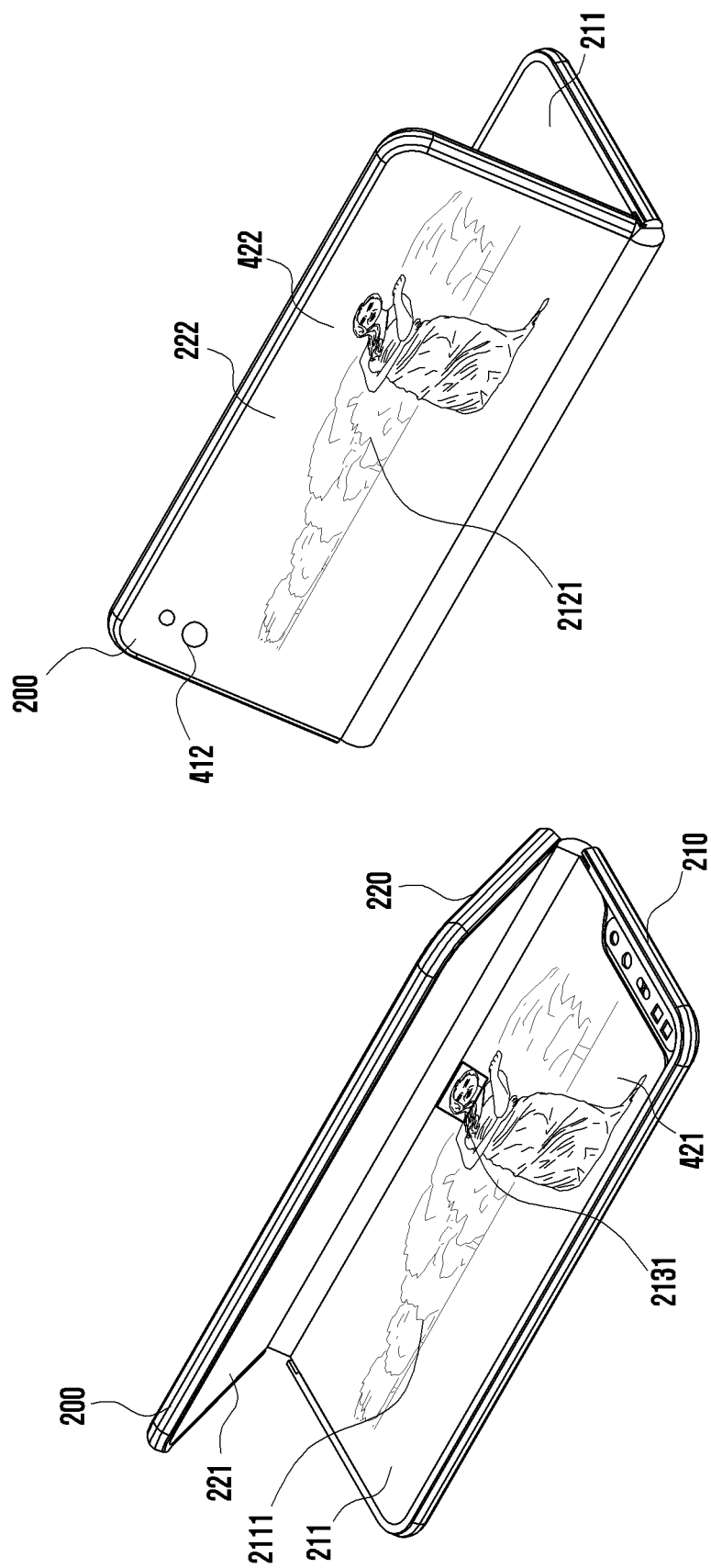
FIG. 21 is a diagram illustrating an example state, in which a preview is displayed based on an operation of a camera module when the electronic device is in a second specific folding state according to an embodiment.

FIG. 20 is a flowchart illustrating an example operation of an electronic device 200 according to an embodiment. FIG. 21 is a diagram illustrating an example state, in which a preview is displayed based on an operation of a camera module when the electronic device 200 is in a second specific folding state.

In operation 2010, the electronic device (e.g., the electronic device 200 of FIG. 2A) according to various embodiments may execute a specific application (e.g., a camera module application) based on a first user input, and activate the second camera module (e.g., the second camera module 412 of FIGS. 2A and 2B).

According to various embodiments, the electronic device 200 may receive a user input in various folding states, and may activate the second camera module 412 in response to the first user input. For example, the electronic device 200 may receive the user input while the foldable housing (e.g., 210 and 220 of FIG. 2A) is in an unfolded state, a folded state, or an intermediate state between the unfolded state and the folded state, and may activate the second camera module 412 in response to the user input.

In operation 2020, the electronic device 200 according to various embodiments may detect that the folding state of the foldable housing (e.g., 210 and 220 of FIG. 2A) is a second specific state (e.g., the state of FIG. 5B) using the sensor module 430.

According to various embodiments, as illustrated in FIG. 21, the second specific state (e.g., the state of FIG. 5B) may refer, for example, to a state in which the angle between the first housing 210 and the second housing 220 is a second specific range (e.g., an acute angle). According to an embodiment, the electronic device 200 may determine that the folding state is the second specific state when the angle defined by the first housing 210 and the second housing 220 is a value in a range of about 15 degrees to 90 degrees. According to another embodiment, the electronic device 200 may determine that the folding state is the second specific state if it is detected that the distance between the first surface 211 and the third surface 221 is smaller than a specific value.

Referring to FIG. 21, in operations 2030 and 2040, if the folding state of the foldable housing (e.g., 210 and 220 of FIG. 2A) is a second specific state, the electronic device 200 according to an embodiment may generate a third preview image 2111 based on the second information acquired through the second camera module 412, display the third preview image 2111 through a portion (e.g., the first portion or the first surface 211 of FIG. 2A) of the first display 421, generate a fourth preview image 2121 based on the second information, and display the fourth preview image 2121 through the second display 422 (e.g., the sub-display 252 of FIGS. 2A and 2B). For example, if the folding state is the second specific state, the electronic device 200 may not only activate the first display 421 (e.g., the display 230 of FIGS. 2A and 2B) but also activate the second display 422, and may display a preview image through the first display 421 and the second display 422. For example, as illustrated in FIG. 21, the second specific state may be the intermediate state (e.g., an angle defined by the first housing 210 and the second housing 220 is an acute angle of FIG. 5B) of the foldable housing 210 and 220, and the electronic device 200 may display a preview image through the first display 421 and the second display 422, respectively.

According to various embodiments, the second specific state may be a state (e.g., a state in which the first surface 211 is parallel to the bottom surface) in which the first surface 211 of the electronic device 200 is positioned on the bottom surface, and may be a state in which the third surface 221 is inclined from the first surface 211 at a specific angle (e.g., an acute angle).

The electronic device 200 according to various embodiment may generate the third preview 2111 based on a resolution of at least a portion of the first display 421, for example, a first portion corresponding to the first surface 211 of the first display 421 if the second camera module 412 is activated in the second specific state. The electronic device 200 may provide photographing information to the user (e.g., the first user 701) who manipulates the electronic device 200 by displaying the third preview image 2111 through at least a portion of the first display 421, for example, the first portion corresponding to the first surface 211 of the first display 421. For example, the first user 701 may photograph the front side (e.g., the direction in which the second camera module 412 is exposed) while viewing the third preview image 2111 through the first potion corresponding to the first surface of the first display 421.

The electronic device 200 according to various embodiments may provide photographing information to the second user 702 who is being photographed by displaying the fourth preview image 2121 through the second display 422 if the second camera module 412 is activated in the second specific state. For example, the second user 702 who is being photographed may identify his or her facial expression or pose while viewing the fourth preview image 2121 through the second display 422 of the electronic device 200.

Figure 22:
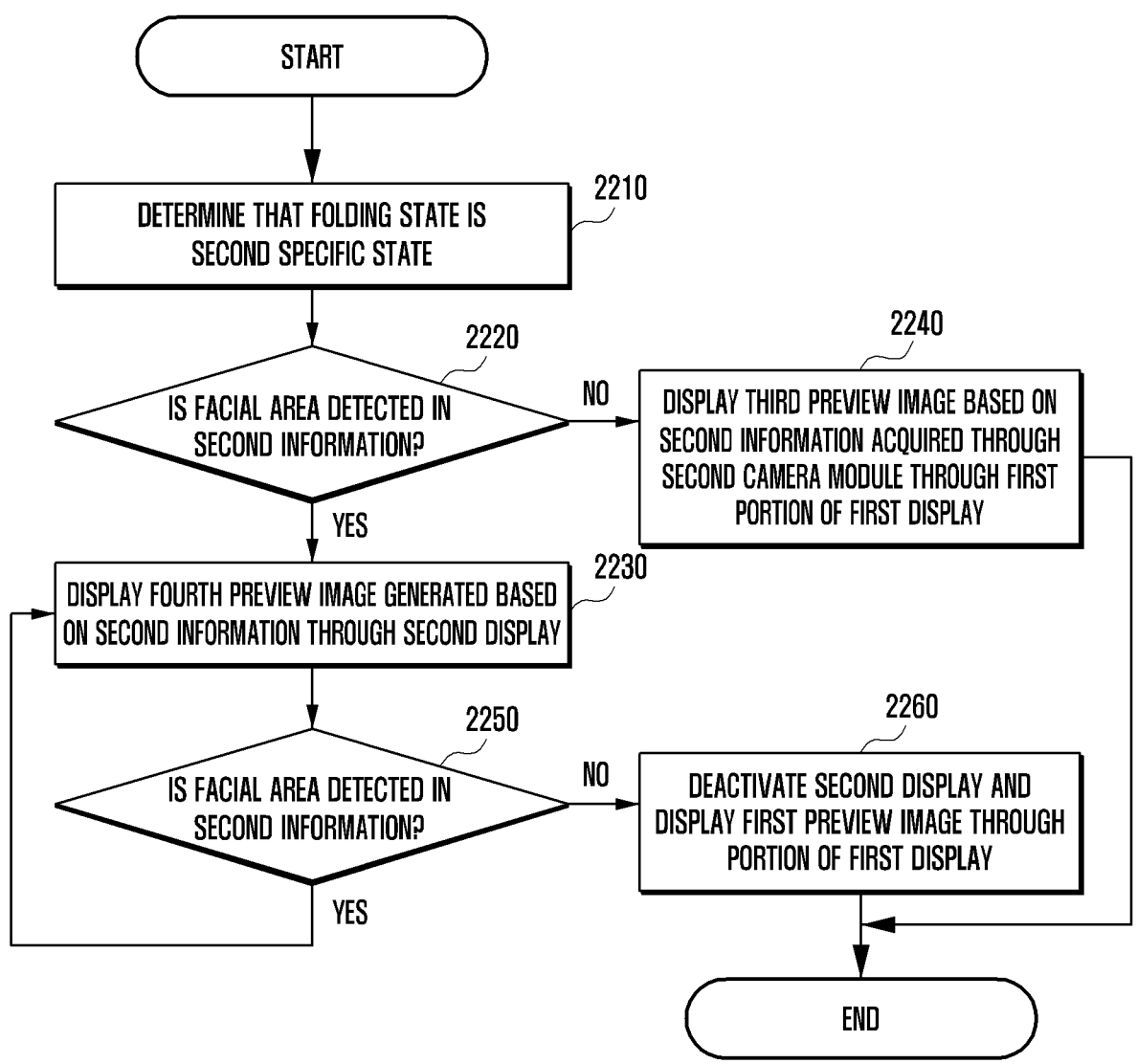
FIG. 22 is a flowchart illustrating an example operation of activating a second display based on detection of a facial area by an electronic device according to an embodiment.

FIG. 22 is a flowchart illustrating an example operation of activating a second display 422 based on detection of a facial area by an electronic device 200 according to another embodiment. According to various embodiments, FIG. 22 may be a flowchart illustrating operation 2040 illustrated in FIG. 20.

Referring to FIG. 22, in operation 2210, the electronic device (e.g., the electronic device 200 of FIG. 2A) according to an embodiment may determine that the folding state of the foldable housing (e.g., 210 and 220 of FIG. 2A) is a second specific state (e.g., the state of FIG. 5B) using the sensor module (e.g., 430 of FIG. 4) while the second camera module (e.g., the second camera module 412 of FIGS. 2A and 2B) is activated and the fourth preview image (2121 of FIG. 21) is displayed through the second display 252 (e.g., the second display 252 of FIGS. 2A and 2B). According to various embodiments, operation 2210 may be the same as or similar to operation 2020 illustrated in FIG. 20.

In operation 2220, the electronic device 200 according to an embodiment may determine whether a facial area (e.g., 2131 of FIG. 21) is detected from the second information acquired through the second camera module (e.g., 412 of FIG. 21). According to an embodiment, the electronic device 200 may detect a portion of the human body, for example, a face from an image (the second information) acquired through the second camera module 412, and may determine a portion corresponding to the face in the image as a facial area (2131 of FIG. 21).

In operation 2230, the electronic device 200 according to an embodiment may display the fourth preview image (2121 of FIG. 21) generated based on the second information through the second display 422 if a facial area (2131 of FIG. 21) is detected from the second information (e.g., the result of operation 2220 is "Yes"). For example, the electronic device 200 may provide photographing information to the second user 702 who is being photographed by activating the second display 422 if the facial area (2131 of FIG. 21) is detected from the second information and displaying the fourth preview image 2121 through the second display 422. According to another embodiment, the electronic device 200 may activate the second display 422 if the facial area 2131 is detected from the third preview image 2111, and may display the fourth preview image through the second display 422.

The electronic device 200 according to various embodiments may determine whether the image acquired through the second camera module 412 includes a facial area 2131 when the second camera module 412 is activated in the second specific state (e.g., the angle between the first housing 210 and the second housing 220 is an acute angle). The electronic device 200 may regard that the user (e.g., the first user 701) who manipulates the electronic device 200 is to photograph another user (e.g., the second user 702) if the facial area 2131 is detected from the image acquired through the second camera module 412 and activate the second display 422, and may display the fourth preview image 2121 through the second display 422.

The electronic device 200 according to various embodiments may prevent and/or reduce unnecessary waste of electric power by regarding that there is no subject (e.g., the second user 702) when a specific object (e.g., the facial area 2131) is not detected from the image acquired through the second camera module 412 (e.g., the result of operation 2220 is "No") and not activating the second display 422. The electronic device 200 according to various embodiments may activate the first display (e.g., 421 of FIG. 21) (e.g., the display 230 of FIGS. 2A and 2B) as in operation 2240 when a facial area 2131 is not detected from the image acquired through the second camera module 412, and may display the third preview image 2111 through at least a portion of the first display 421.

In operation 2250, the electronic device 200 according to an embodiment may display the third preview image 2111 through the first display 421, and may determine whether the facial area 2131 is detected from the second information acquired through the second camera module 412 while the fourth preview image 2121 is displayed through the second display 422. According to various embodiments, operation 2240 may be the same as or similar to operation 2220.

In operation 2260, the electronic device 200 according to an embodiment may display the third preview image 2111 through the first display 421, and may deactivate the second display 422 if the facial area 2231 is not detected from the second information acquired through the second camera module 412 while the fourth preview image 2121 is displayed through the second display 422 (e.g., the result of operation 2250 is "No") and display the third preview image 2111 through the first display 421. The electronic device 200 according to various embodiments may prevent and/or reduce unnecessary waste of electric power by regarding that there is no subject (e.g., the second user 702) when a facial area 2131 is not detected from the image acquired through the second camera module 412 (e.g., the result of operation 2250 is "No") and not activating the second display 422.

According to various embodiments, the electronic device 200 may determine a state in which the electronic device 200 is positioned, and may determine whether the second display 422 is activated based on the result obtained by determining the positioning state. For example, the electronic device 200 may detect that a surface of the electronic device 200, through which the second display 422 is exposed, for example, the fourth surface (e.g., 222 of FIG. 2A) is positioned on the bottom (or parallel to the ground surface) using at least one sensor, for example, an acceleration sensor or a gyro sensor, and may deactivate the second display 422 in response to the detection of the state.

Figure 23:
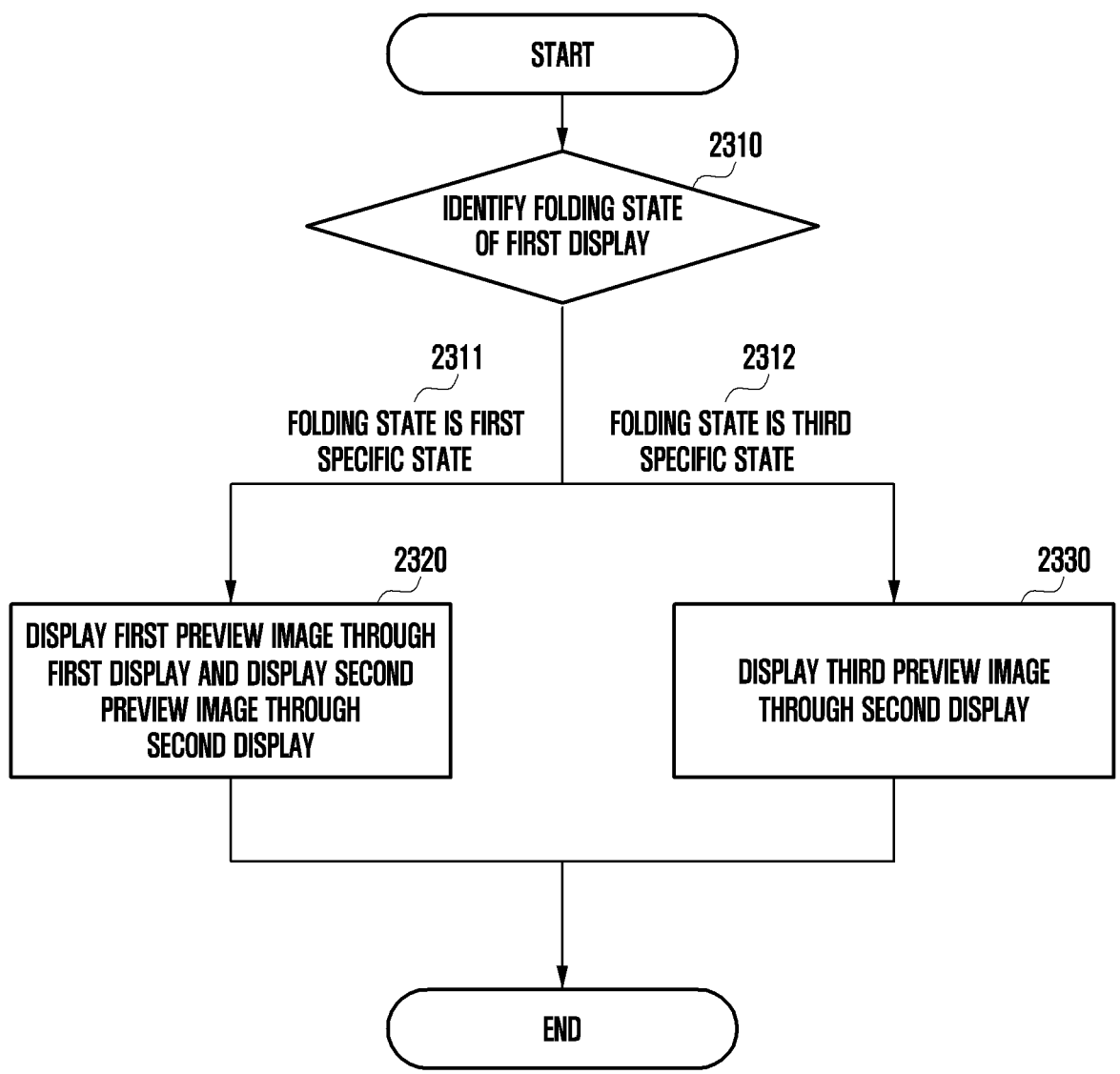
FIG. 23 is a flowchart illustrating an example operation of an electronic device based on a folding state according to various embodiments.

FIG. 23 is a flowchart illustrating an example operation of an electronic device based on a folding state according to various embodiments.

Referring to FIG. 23, in operation 2310, the electronic device (e.g., the electronic device 200 of FIG. 2A) according to an embodiment may identify the folding state of the first display 421 (e.g., the first display 230 of FIGS. 2A and 2B). For example, the electronic device 200 may determine the folding state of the foldable housing (e.g., 210 and 220 of FIG. 2A). According to various embodiments, operation 2310 may be the same as or similar to operation 930 illustrated in FIG. 9.

In operation 2320, the electronic device 200 according to an embodiment may display the first preview image through the first display 421 if it is detected that the folding state is the first specific state (e.g., the state of FIG. 5A) (e.g., 2311 of FIG. 23), and may display the second preview image through the second display 422 (e.g., the second display 252 of FIGS. 2A and 2B). According to various embodiments, operation 2320 may be the same as or similar to operation 640 illustrated in FIG. 6 or operation 950 illustrated in FIG. 9.

In operation 2330, the electronic device 200 according to an embodiment may display the third preview image through the second display 422 if it is detected that the folding state is a third specific state (e.g., the state of FIG. 5C) (e.g., 2312 of FIG. 23). For example, the electronic device 200 may generate the third preview image based on the image information (the first information) acquired through the first camera module (e.g., 411 of FIG. 2A), and may display the generated third preview image through the second display 422. According to various embodiments, the electronic device 200 may generate the third preview image based on the information of the second display 422, on which the third preview image is to be displayed when the third preview image is generated. For example, the electronic device 200 may generate the third preview image optimized for the resolution of the second display 422. According to various embodiments, the third preview image may be the same as or similar to the second preview image described with reference to FIGS. 11, 12, 13 and 14.

Figure 24:
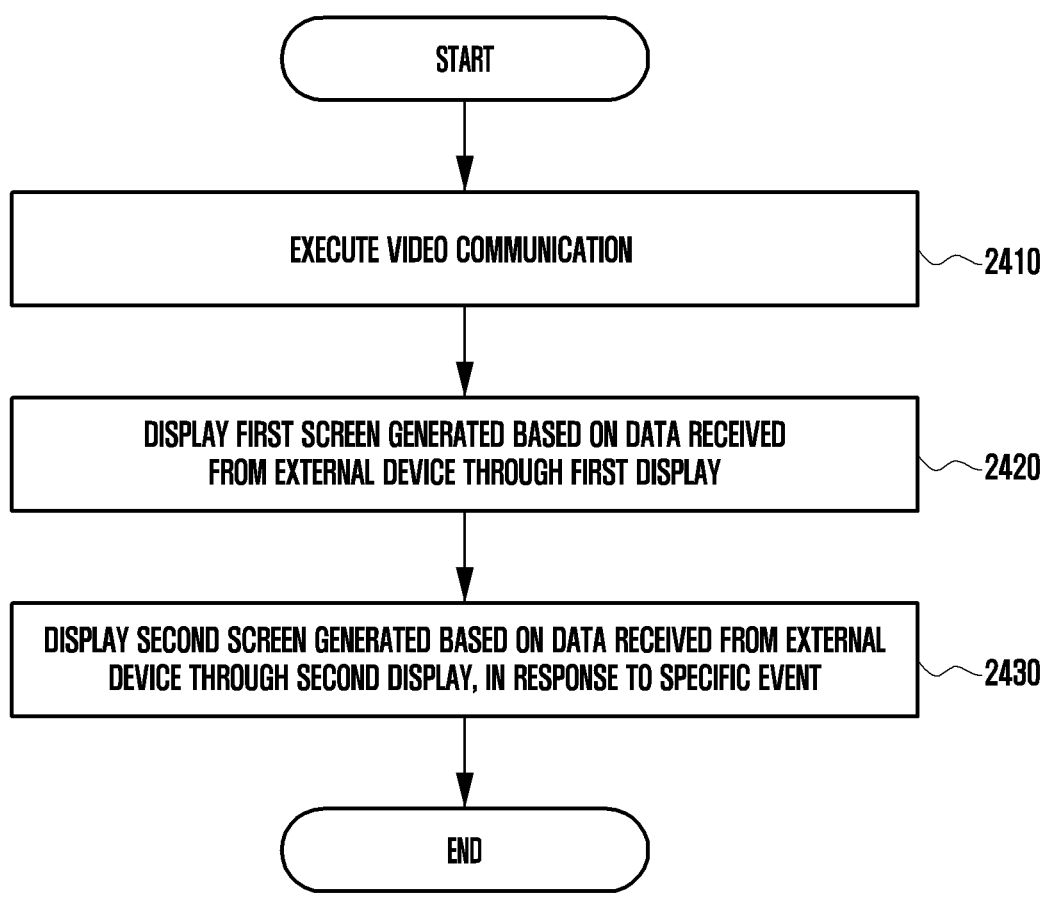
FIG. 24 is a flowchart illustrating an example operation of an electronic device based on execution of a video communication according to an embodiment.

FIG. 24 is a flowchart illustrating an example operation of an electronic device based on execution of a video communication according to an embodiment.

Referring to FIG. 24, in operation 2410, an electronic device (e.g., 200 of FIG. 2A) according to an embodiment may execute a video communication based on a user input. For example, if receiving a request for a video communication from an external device (e.g., the external device 104 of FIG. 1) and receiving a first specific input (e.g., an input of a physical key or a touch input through a display (230 or 252 of FIG. 2A)) of the user related to the request, the electronic device 200 may execute a video communication. Further, the electronic device may execute a video communication based on a second specific input of the user for sending a video communication.

In operation 2420, the electronic device 200 according to an embodiment may display a first screen generated based on data received from an external device (e.g., the external device 104 of FIG. 1) through the first display 421 (e.g., 230 of FIG. 2A). According to various embodiments, the electronic device 200 may detect the folding state of the foldable housing (e.g., 210 and 220 of FIG. 2A) in a method that is the same as or similar to operation 930 illustrated in FIG. 9. According to an embodiment, the electronic device 200 may activate the first display 421 if the folding state is a first specific state (e.g., the state of FIG. 5A) and may display a first screen, that is, a screen of a counterpart transmitted by an external device (e.g., the external device 104 of FIG. 1) through the first display 421.

In operation 2430, the electronic device 200 according to an embodiment may display a second screen generated based on data received from an external device (e.g., the external device 104 of FIG. 1) in response to a specific event through the second display 422 (e.g., 252 of FIG. 2A). For example, the electronic device 200 may activate the second display (e.g., 252 of FIG. 2A) 422 in response to the specific event, and may display a second screen, that is, a screen of a counterpart transmitted by an external device (e.g., the external device 104 of FIG. 1) through the second display 422.

According to various embodiments, the method for generating the second screen by the electronic device 200 may be the same as or similar to the method for generating the second preview image described with reference to FIGS. 11, 12, 13 and 14.

According to various embodiments, the specific event may include, for example, a touch input of a user through the first display 421, an input of pressing a specific physical button (not illustrated) disposed at at least a portion of the foldable housing (e.g., 210 and 220 of FIG. 2A), an operation of folding the foldable housing (e.g., 210 and 220 of FIG. 2A) by a specific angle range (e.g., 10 degrees to 80 degrees), unfolding the foldable housing, or the like. According to another embodiment, the specific event may include, for example, detection of a portion (e.g., a facial area (721 of FIG. 14)) the body of the user similar to operation 1020 of FIG. 10. The electronic device 200 may activate or deactivate the function of activating the second display 422 through a user function menu in response to detection of the portion (e.g., the facial area (721 of FIG. 14)) of the body of the user.

According to various embodiments, the electronic device 200 may execute a video communication in the folded state (e.g., the third specific state or the state of FIG. 5C) unlike the one illustrated in FIG. 24, and may display the second screen generated based on the data received from an external device (e.g., the external device 104 of FIG. 1) through the second display 422 (e.g., 252 of FIG. 2A) when the video communication is executed in the folded state. According to an embodiment, the electronic device 200 may display the first screen generated based on the data received from the external device (e.g., the external device 104 of FIG. 1) through the first display 421 (e.g., 230 of FIG. 2A) in a way that is the same as or similar to operation 2420 of FIG. 24 if the folded state of the foldable housing (e.g., 210 and 220 of FIG. 2A) is detected while a video communication is executed in the folded state. According to an embodiment, the electronic device 200 may activate the first display 421 if detecting conversion of the folded state (e.g., the state of FIG. 5C) to the unfolded state (e.g., the state of FIG. 5A) during the execution of the video communication, and may deactivate the second display 422. According to another embodiment, the electronic device 200 may determine that a specific event is generated if detecting the conversion of the folded state (e.g., the state of FIG. 5C) to the unfolded state (e.g., the state of FIG. 5A) during the execution of the video communication, and if the specific event is generated, may display a screen (e.g., the first screen or the second screen) generated based on the data received from the external device (e.g., the external device 104 of FIG. 1) by activating both of the first and second displays (e.g., 230 and 252 of FIG. 2A) in a way that is the same as or similar to 2430 of FIG. 24.

Figure 25:
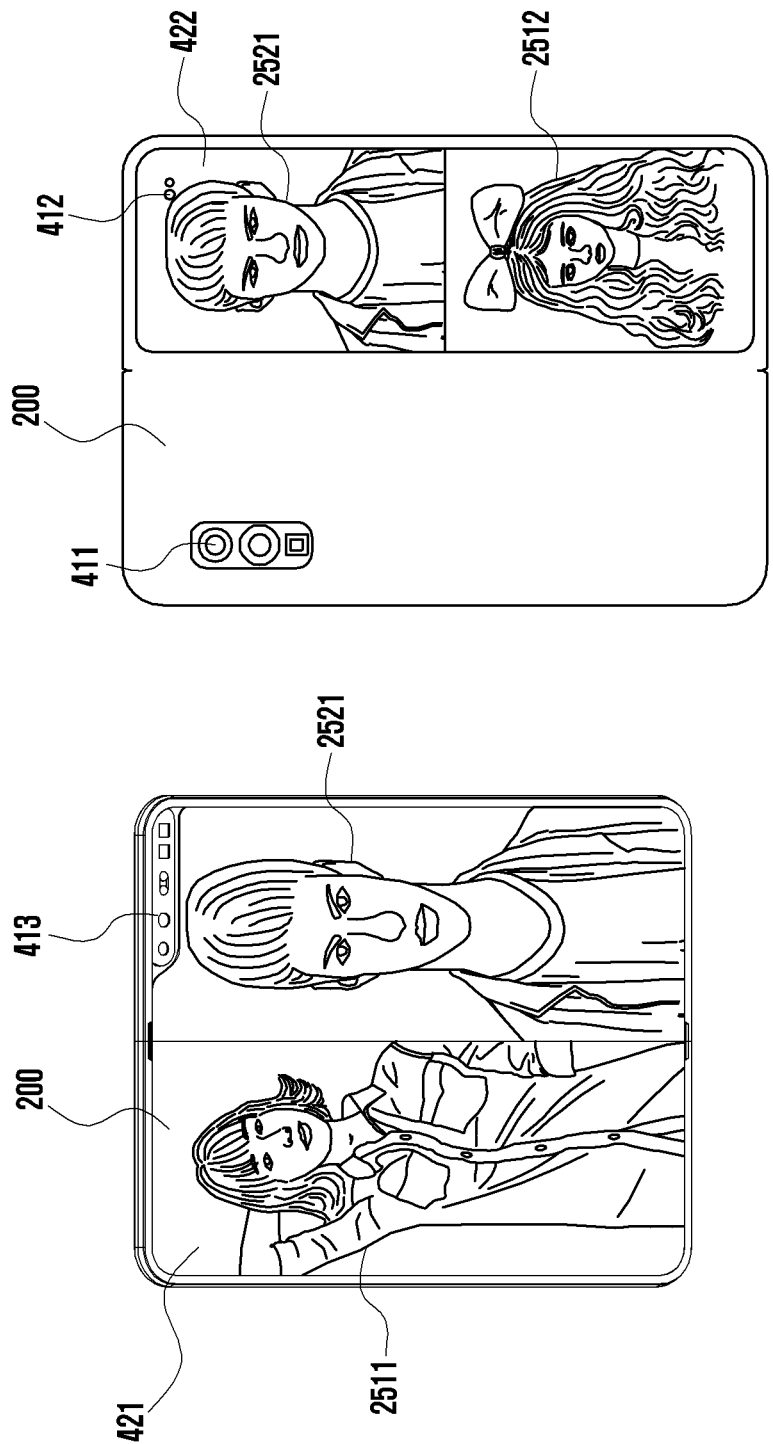
FIG. 25 is a diagram illustrating an example method for displaying information through first and second displays when a video communication is executed through an electronic device according to an embodiment.

FIG. 25 is a diagram illustrating an example method for displaying information through first and second displays when a video communication is executed through an electronic device according to an embodiment.

Referring to FIG. 25, the electronic device (e.g., 200 of FIG. 2A) according to an embodiment may execute a video communication in a method that is the same as or similar to operation 2410, 2420 and 2430 illustrated in FIG. 24, and may display the screen 2521 generated based on the data received from the external device (e.g., the external device 104 of FIG. 1) through the first display 421 and the second display 422. For example, the screen 2521 may be a screen 2521 of the counterpart who is using the video communication. According to an embodiment, the electronic device 200 may display not only the screen 2521 of the counterpart but also a first self-screen 2511 of a first user (e.g., the first user 701 of FIG. 7) who views the first display 421, through the first display 421. For example, the first self-screen 2511 may include an image captured in real time using the third camera module 413 (e.g., 413 of FIG. 2A) while the video communication is executed. According to an embodiment, the electronic device 200 may display not only the screen 2521 of the counterpart but also a second self-screen 2512 of a second user (e.g., the second user 702 of FIG. 7) who views the second display 422, through the second display 422. For example, the second self-screen 2512 may include an image captured in real time using the first camera module 411 (e.g., 411 of FIG. 2A) while the video communication is executed. According to another embodiment, the second self-screen 2512 may include an image captured in real time using the second camera module 412 (e.g., 412 of FIG. 2A) while the video communication is executed.

According to various embodiments, while the video communication is executed, the arrangement (layout) of the screen 2521 of the counterpart and the first self-screen 2511 displayed on the first display 421 may be variously modified or changed. According to various embodiments, while the video communication is executed, the arrangement (layout) the screen 2521 of the counterpart and the second self-screen 2512 displayed on the first display 422 may be variously modified or changed.

According to various embodiments, the electronic device 200 may transmit the first data corresponding to the first self-screen 2511 and the second data corresponding to the second self-screen 2512 to the external device (e.g., the external device 104 of FIG. 1) while the video communication is executed.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. One of ordinary skill in the art will understand that various changes in form and detail may be made without departing from the true spirit and full scope of the disclosure, including the appended claims and their equivalents.

What is claimed is:

1. An electronic device comprising:
a foldable housing comprising:
   a hinge,
   a first housing connected to the hinge and comprising first and second opposed surfaces, and
   a second housing connected to the hinge and configured to be foldable about the hinge relative to the first housing, the second housing comprising third and fourth opposed surfaces, wherein the first surface and the third surface face in opposite directions in a fully folded state and in a same direction in a fully unfolded state;
a sensor module;
a first display configured to be foldable about the hinge and disposed on the first surface and the third surface;
a second display viewable through at least a portion of the fourth surface;
a first camera exposed through at least a portion of the second surface; and
a processor,
wherein the processor is configured to control the electronic device to:
   based on a specific application being executed by the processor based on a first input to the electronic device, activate the first camera;
   display, on the first display, a first preview image based on first information acquired by the first camera;
   determine a folding state of the foldable housing using the sensor module;
   based on the folding state being a first specific state,
      identify whether the first information includes a certain image characteristic, and
      based on identifying that the first information includes the certain image characteristic,
         display, on the second display, a second preview image generated based on the first information, and
      based on identifying that the first information does not include the certain image characteristic while the second preview image is displayed on the second display, deactivate the second display, and
wherein the certain image characteristic comprises a facial area.

2. The electronic device of claim 1, wherein the processor is configured to control the electronic device to:

generate the first preview image based on a resolution of the first display; and
generate the second preview image based on a resolution of the second display.

3. The electronic device of claim 1, wherein the processor is configured to control the electronic device to:
generate the first preview image based on a resolution of the first display; and
generate the second preview image by cropping at least a portion of the first preview image based on a resolution of the second display, wherein the cropped portion comprises the facial area.

4. The electronic device of claim 1, wherein the processor is configured to control the electronic device to:
perform photographing using the first camera based on a second input being received by the electronic device while the second preview image is displayed; and
display information related to the photographing of the first camera on the second display.

5. The electronic device of claim 4, wherein the processor is configured to control the electronic device to:
detect whether a person included in the second preview image approaches the electronic device after the photographing is performed; and
based on detecting that the person included in the second preview image approaches the electronic device, display an image captured most recently by the first camera, on the second display.

6. The electronic device of claim 1, further comprising:
a second camera exposed through at least a portion of the fourth surface;
wherein the processor is configured to, based on the folding state being a second specific state different from the first specific state, control the electronic device to:
display a third preview image generated based on second information on at least a portion of the first display.

7. The electronic device of claim 6, wherein the processor is configured to, based on the folding state being the second specific state, control the electronic device to:
detect whether the second information includes the facial area; and
based on the facial area being detected, display a fourth preview image on the second display.

8. The electronic device of claim 7, wherein the processor is configured to control the electronic device to:
generate the third preview image from the second information based on a resolution of the at least a portion of the first display; and
generate the fourth preview image from the second information based on a resolution of the second display.

9. The electronic device of claim 7, wherein the processor is configured to control the electronic device to:
generate the third preview image from the second information based on a resolution of the at least a portion of the first display; and
generate the fourth preview image by cropping at least a portion of the third preview image based on a resolution of the second display, wherein the cropped portion comprises the facial area.

10. An electronic device comprising:
a first display, at least a portion of which is foldable;
a second display;
a camera; and
a processor,
wherein the processor is configured to control the electronic device to:

display, on the first display, a first preview image based on image information acquired by the camera;
identify a folding state of the first display;
based on the identified folding state being a first specific state,
identify whether the image information includes a certain image characteristic, and
based on identifying that the image information includes the certain image characteristic,
display, on the second display, a second preview image generated based on the image information, and
based on identifying that the image information does not include the certain image characteristic while the second preview image is displayed on the second display, deactivate the second display; and
based on the identified folding state being a second specific state different from the first specific state,
display a third preview image generated based on the image information on the second display, and
wherein the certain image characteristic comprises a facial area.

11. The electronic device of claim 10, wherein the processor is configured to control the electronic device to:
generate the first preview image from the first information based on a resolution of the first display; and
generate the second preview image from the first information based on a resolution of the second display.

12. The electronic device of claim 10, wherein the processor is configured to, based on the folding state being the first specific state, control the electronic device to:
based on the facial area being detected, generate the second preview image by cropping at least a portion of the first preview image based on a resolution of the second display, wherein the cropped portion comprises the facial area.

13. The electronic device of claim 10, wherein the first specific state includes a state in which an angle defined by a first portion of the first display and a second portion of the first display is in a range of 90 degrees to 270 degrees.

14. The electronic device of claim 10, wherein the second specific state includes a state in which an angle defined by a first portion of the first display and a second portion of the first display is in a range of 0 degrees to 10 degrees.

15. A method for displaying information by an electronic device, the electronic device comprising:
a first display, at least a portion of which is foldable;
a second display; and
a camera,
the method comprising:
displaying, on the first display, a first preview image based on image information acquired by the camera;
identifying a folding state of the first display;
determining that the identified folding state being a first specific state,
based on determining that the identified folding state being a first specific state,
displaying, on the second display, a second preview image generated based on the image information, and
determining identifying whether the image information includes a certain image characteristic, and
determining that the image information does not include the certain image characteristic; and
based on determining that the image information does not include the certain image characteristic, while the second preview image is displayed on the second display, deactivating the second display; and wherein the certain image characteristic comprises a facial area.

16. The method of claim 15, wherein the method further comprises:

generating the first preview image from the first information based on a resolution of the first display; and generating the second preview image from the first information based on a resolution of the second display.

17. The method of claim 15, wherein the method further comprises:

generating the second preview image by cropping at least a portion of the first preview image based on a resolution of the second display, and wherein the cropped portion comprises the facial area.

18. The method of claim 15, wherein the first specific state includes a state in which an angle defined by a first portion of the first display and a second portion of the first display is in a range of 90 degrees to 270 degrees.

19. The method of claim 15, further comprising:

determining whether the identified folding state is a second specific state different from the first specific state;

determining that the identified folding state is the second specific state; and based on determined that the identified folding state is the second specific state, displaying, on the second display, a third preview image generated based on the image information, wherein the second specific state includes a state in which an angle defined by a first portion of the first display and a second portion of the first display is in a range of 0 degrees to 10 degrees.

* * * * *